(12) United States Patent
Case, Jr. et al.

(10) Patent No.: US 9,694,239 B2
(45) Date of Patent: Jul. 4, 2017

(54) MULTI-SENSOR MONITORING OF ATHLETIC PERFORMANCE

(71) Applicant: NIKE, Inc., Beaverton, OR (US)

(72) Inventors: Charles W. Case, Jr., Lake Oswego, OR (US); Jason P. Martin, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 464 days.

(21) Appl. No.: 14/253,507

(22) Filed: Apr. 15, 2014

(65) Prior Publication Data

US 2014/0228987 A1  Aug. 14, 2014

Related U.S. Application Data

(63) Continuation of application No. 13/312,684, filed on Dec. 6, 2011, now Pat. No. 8,777,815, which is a (Continued)

(51) Int. Cl.
*A63B 24/00* (2006.01)
*G01C 22/00* (2006.01)
(Continued)

(52) U.S. Cl.
CPC .......... *A63B 24/0062* (2013.01); *A63B 24/00* (2013.01); *A63B 24/0003* (2013.01); (Continued)

(58) Field of Classification Search
CPC ............ A63B 24/0003; A63B 2220/62; A63B 2220/20
See application file for complete search history.

(56) References Cited

U.S. PATENT DOCUMENTS

| 3,797,010 A | 3/1974 | Adler et al. |
| 4,371,945 A | 2/1983 | Karr et al. |

(Continued)

FOREIGN PATENT DOCUMENTS

| CN | 1256752 A | 6/2000 |
| CN | 1660457 A | 8/2005 |

(Continued)

OTHER PUBLICATIONS

Sep. 2, 2014—(CN) Office Action—App 201180049111.6—Eng Tran.

(Continued)

*Primary Examiner* — Kang Hu
*Assistant Examiner* — Malina D Blaise
(74) *Attorney, Agent, or Firm* — Banner & Witcoff, Ltd.

(57) ABSTRACT

Athletic performance monitoring systems and methods, many of which utilize, in some manner, global positioning satellite ("GPS") data, provide data and information to athletes and/or to equipment used by athletes during an athletic event. Such systems and methods may provide route information to athletes and/or their trainers, e.g., for pre-event planning, goal setting, and calibration purposes. Such systems and methods optionally may provide real time information to the athlete while the event takes place, e.g., to assist in reaching the pre-set goals. Additionally, data and information collected by such systems and methods may assist in post-event analysis for athletes and their trainers, e.g., to evaluate past performances and to assist in improving future performances.

20 Claims, 7 Drawing Sheets

Related U.S. Application Data continuation of application No. 12/770,355, filed on Apr. 29, 2010, now Pat. No. 8,086,421, which is a continuation of application No. 12/552,958, filed on Sep. 2, 2009, now Pat. No. 8,112,251, which is a continuation of application No. 11/769,545, filed on Jun. 27, 2007, now Pat. No. 7,603,255, which is a continuation of application No. 11/014,241, filed on Dec. 17, 2004, now Pat. No. 7,254,516.

(51) Int. Cl.
| | |
|---|---|
| *G07F 17/32* | (2006.01) |
| *G09B 5/02* | (2006.01) |
| *G09B 19/00* | (2006.01) |
| *A63B 22/00* | (2006.01) |
| *A63B 71/06* | (2006.01) |

(52) U.S. Cl.
CPC ...... *A63B 24/0021* (2013.01); *A63B 24/0075* (2013.01); *G01C 22/006* (2013.01); *G07F 17/323* (2013.01); *G09B 5/02* (2013.01); *G09B 19/003* (2013.01); *A63B 71/0686* (2013.01); *A63B 2024/0025* (2013.01); *A63B 2024/0068* (2013.01); *A63B 2220/12* (2013.01); *A63B 2220/18* (2013.01); *A63B 2220/20* (2013.01); *A63B 2220/30* (2013.01); *A63B 2220/62* (2013.01); *A63B 2220/72* (2013.01); *A63B 2220/73* (2013.01); *A63B 2220/75* (2013.01); *A63B 2220/76* (2013.01); *A63B 2220/836* (2013.01); *A63B 2225/50* (2013.01); *A63B 2230/04* (2013.01); *A63B 2230/08* (2013.01)

(56) References Cited

U.S. PATENT DOCUMENTS

| | | | |
|---|---|---|---|
| 4,571,680 A | 2/1986 | Wu | |
| 4,578,769 A | 3/1986 | Frederick | |
| 4,674,743 A | 6/1987 | Hirano | |
| 4,703,445 A | 10/1987 | Dassler | |
| 4,736,312 A | 4/1988 | Dassler et al. | |
| 4,763,284 A | 8/1988 | Carlin | |
| 4,771,394 A | 9/1988 | Cavanagh | |
| 4,828,257 A | 5/1989 | Dyer et al. | |
| 4,962,469 A | 10/1990 | Ono et al. | |
| 5,033,013 A | 7/1991 | Kato et al. | |
| 5,335,188 A | 8/1994 | Brisson | |
| 5,373,651 A | 12/1994 | Wood | |
| 5,485,402 A | 1/1996 | Smith et al. | |
| 5,500,635 A | 3/1996 | Mott | |
| 5,524,637 A * | 6/1996 | Erickson | A61B 5/1038 482/8 |
| 5,553,007 A | 9/1996 | Brisson | |
| 5,583,776 A | 12/1996 | Levi et al. | |
| 5,596,652 A | 1/1997 | Piatek et al. | |
| 5,598,849 A | 2/1997 | Browne | |
| 5,678,448 A | 10/1997 | Fullen et al. | |
| 5,720,200 A | 2/1998 | Anderson et al. | |
| 5,724,265 A | 3/1998 | Hutchings | |
| 5,749,372 A | 5/1998 | Allen et al. | |
| 5,779,566 A * | 7/1998 | Wilens | A63B 69/36 473/131 |
| 5,793,882 A | 8/1998 | Piatek et al. | |
| 5,802,492 A | 9/1998 | DeLorme et al. | |
| 5,815,954 A | 10/1998 | Huang | |
| 5,857,066 A * | 1/1999 | Wyche | G06T 17/05 345/419 |
| 5,857,939 A | 1/1999 | Kaufman | |
| 5,875,571 A | 3/1999 | Huang | |
| 5,890,997 A | 4/1999 | Roth | |
| 5,931,763 A | 8/1999 | Alessandri | |
| 5,955,667 A | 9/1999 | Fyfe | |
| 6,002,982 A | 12/1999 | Fry | |
| 6,013,007 A * | 1/2000 | Root | A63B 24/0006 482/8 |
| 6,018,705 A | 1/2000 | Gaudet et al. | |
| 6,052,654 A | 4/2000 | Gaudet et al. | |
| 6,072,467 A | 6/2000 | Walker | |
| 6,077,193 A | 6/2000 | Buhler et al. | |
| 6,122,960 A | 9/2000 | Hutchings et al. | |
| 6,132,391 A | 10/2000 | Onari et al. | |
| 6,183,425 B1 | 2/2001 | Whalen et al. | |
| 6,198,431 B1 * | 3/2001 | Gibson | G01C 21/20 342/357.57 |
| 6,285,314 B1 | 9/2001 | Nagatsuma et al. | |
| 6,312,363 B1 | 11/2001 | Watterson et al. | |
| 6,321,128 B1 * | 11/2001 | Costin, IV | A63B 69/36 473/131 |
| 6,356,856 B1 | 3/2002 | Damen et al. | |
| 6,375,612 B1 | 4/2002 | Guichon et al. | |
| 6,396,413 B2 | 5/2002 | Hines et al. | |
| 6,424,264 B1 | 7/2002 | Giraldin et al. | |
| 6,430,843 B1 | 8/2002 | Potter et al. | |
| 6,447,424 B1 * | 9/2002 | Ashby | A63B 21/005 482/54 |
| 6,456,930 B1 | 9/2002 | Naito et al. | |
| 6,463,385 B1 | 10/2002 | Fry | |
| 6,493,652 B1 | 12/2002 | Ohlenbusch et al. | |
| 6,498,994 B2 * | 12/2002 | Vock | A42B 3/0433 702/141 |
| 6,513,381 B2 | 2/2003 | Fyfe et al. | |
| 6,522,266 B1 | 2/2003 | Soehren et al. | |
| 6,526,158 B1 | 2/2003 | Goldberg | |
| 6,531,963 B1 | 3/2003 | Nyfelt | |
| 6,539,336 B1 | 3/2003 | Vock et al. | |
| 6,545,661 B1 | 4/2003 | Goschy et al. | |
| 6,549,845 B2 | 4/2003 | Eakle, Jr. et al. | |
| 6,569,092 B1 | 5/2003 | Guichon et al. | |
| 6,571,193 B1 * | 5/2003 | Unuma | A43B 3/0005 340/853.2 |
| 6,582,342 B2 | 6/2003 | Kaufman | |
| 6,600,407 B2 | 7/2003 | Paek | |
| 6,614,352 B2 | 9/2003 | Pellet et al. | |
| 6,614,392 B2 | 9/2003 | Howard | |
| 6,623,427 B2 | 9/2003 | Mandigo | |
| 6,626,799 B2 | 9/2003 | Watterson et al. | |
| 6,716,139 B1 | 4/2004 | Hosseinzadeh-Dolkhani et al. | |
| 6,735,542 B1 | 5/2004 | Burgett et al. | |
| 6,788,200 B1 | 9/2004 | Jamel et al. | |
| 6,805,006 B2 | 10/2004 | Guzman | |
| 6,813,582 B2 | 11/2004 | Levi et al. | |
| 6,817,979 B2 | 11/2004 | Nihtila | |
| 6,843,726 B1 | 1/2005 | Nomi et al. | |
| 6,865,825 B2 | 3/2005 | Bailey, Sr. et al. | |
| 6,876,947 B1 | 4/2005 | Darley et al. | |
| 6,882,955 B1 | 4/2005 | Ohlenbusch et al. | |
| 6,898,550 B1 | 5/2005 | Blackadar et al. | |
| 6,973,384 B2 * | 12/2005 | Zhao | G01C 21/3492 342/357.29 |
| 6,997,852 B2 | 2/2006 | Watterson et al. | |
| 7,003,122 B2 | 2/2006 | Chen | |
| 7,028,547 B2 | 4/2006 | Shiratori et al. | |
| 7,062,225 B2 | 6/2006 | White | |
| 7,174,277 B2 * | 2/2007 | Vock | A43B 3/0005 340/545.6 |
| 7,251,454 B2 | 7/2007 | White | |
| 7,254,516 B2 | 8/2007 | Case, Jr. et al. | |
| 7,292,867 B2 * | 11/2007 | Werner | H01Q 1/273 342/357.31 |
| 7,519,327 B2 | 4/2009 | White | |
| 7,603,255 B2 | 10/2009 | Case, Jr. et al. | |
| 2001/0054014 A1 | 12/2001 | Noda et al. | |
| 2002/0019296 A1 | 2/2002 | Freeman et al. | |
| 2002/0022551 A1 | 2/2002 | Watterson et al. | |
| 2002/0027524 A1 | 3/2002 | Pippin | |
| 2002/0077883 A1 | 6/2002 | Lancos et al. | |
| 2002/0080198 A1 * | 6/2002 | Giraldin | G07C 9/00111 715/864 |
| 2002/0091796 A1 | 7/2002 | Higginson et al. | |

(56) References Cited

U.S. PATENT DOCUMENTS

| | | |
|---|---|---|
| 2002/0116147 A1 | 8/2002 | Vock et al. |
| 2002/0130899 A1* | 9/2002 | Ryan ................... G06Q 30/06 715/738 |
| 2002/0142887 A1 | 10/2002 | O' Malley |
| 2002/0147629 A1 | 10/2002 | Alsafadi et al. |
| 2002/0147642 A1 | 10/2002 | Avallone et al. |
| 2002/0156677 A1 | 10/2002 | Peters et al. |
| 2002/0165758 A1 | 11/2002 | Hind et al. |
| 2002/0173407 A1 | 11/2002 | Bowman |
| 2002/0174025 A1 | 11/2002 | Hind et al. |
| 2003/0009308 A1 | 1/2003 | Kirtley |
| 2003/0009382 A1 | 1/2003 | D'Arbeloff et al. |
| 2003/0009913 A1 | 1/2003 | Potter et al. |
| 2003/0040922 A1 | 2/2003 | Bodin |
| 2003/0090386 A1 | 5/2003 | Giraldin et al. |
| 2003/0093248 A1 | 5/2003 | Vock et al. |
| 2003/0100326 A1* | 5/2003 | Grube ................ H04W 84/08 455/515 |
| 2003/0114984 A1 | 6/2003 | Scherzinger |
| 2003/0160732 A1 | 8/2003 | Van Heerden et al. |
| 2003/0163283 A1 | 8/2003 | O'Brien |
| 2003/0163287 A1 | 8/2003 | Vock et al. |
| 2003/0171189 A1 | 9/2003 | Kaufman |
| 2004/0046692 A1 | 3/2004 | Robson et al. |
| 2004/0094613 A1 | 5/2004 | Shiratori et al. |
| 2004/0102931 A1* | 5/2004 | Ellis ................... A61B 5/1038 702/188 |
| 2004/0177531 A1 | 9/2004 | DiBenedetto et al. |
| 2004/0209600 A1* | 10/2004 | Werner ................ H01Q 1/273 455/414.1 |
| 2004/0224718 A1 | 11/2004 | Chen |
| 2004/0246145 A1 | 12/2004 | Andrews et al. |
| 2005/0033515 A1 | 2/2005 | Bozzone |
| 2005/0038626 A1 | 2/2005 | Flentov et al. |
| 2005/0049113 A1 | 3/2005 | Yueh et al. |
| 2005/0148388 A1* | 7/2005 | Vayra .................... A63F 13/10 463/32 |
| 2005/0171410 A1* | 8/2005 | Hjelt ..................... A61B 5/00 600/300 |
| 2005/0184878 A1 | 8/2005 | Grold et al. |
| 2005/0195094 A1* | 9/2005 | White ................ A63B 24/0021 340/870.01 |
| 2005/0209050 A1* | 9/2005 | Bartels .............. A63B 24/0084 482/8 |
| 2005/0233859 A1 | 10/2005 | Takai et al. |
| 2005/0248718 A1 | 11/2005 | Howell et al. |
| 2005/0250458 A1 | 11/2005 | Graham et al. |
| 2005/0261609 A1* | 11/2005 | Collings ............. A43B 3/0005 600/592 |
| 2005/0276164 A1* | 12/2005 | Amron .................. G04C 3/002 368/82 |
| 2006/0013351 A1 | 1/2006 | Crider |
| 2006/0084551 A1* | 4/2006 | Volpe, Jr. ........... A63B 71/0686 482/8 |
| 2006/0099556 A1 | 5/2006 | Yeo et al. |
| 2006/0189437 A1 | 8/2006 | Cohen et al. |
| 2006/0204045 A1 | 9/2006 | Antonucci |
| 2007/0247306 A1 | 10/2007 | Case |
| 2008/0077489 A1 | 3/2008 | Gilley et al. |
| 2009/0149299 A1 | 6/2009 | Tchao et al. |
| 2009/0164219 A1 | 6/2009 | Yeung et al. |
| 2010/0011054 A1 | 1/2010 | Pan |
| 2011/0059769 A1 | 3/2011 | Brunolli |

FOREIGN PATENT DOCUMENTS

| | | | |
|---|---|---|---|
| DE | 19860603 A1 | 7/1999 | |
| DE | 202004013989 U1 | 11/2004 | |
| EP | 1134555 A1 | 9/2001 | |
| FR | 2754723 A1 | 4/1998 | |
| GB | 2352348 A | 1/2001 | |
| JP | 08068846 | 12/1996 | |
| JP | 09089584 | 4/1997 | |
| JP | 2001257746 A | 9/2001 | |
| JP | 2002022479 A | 1/2002 | |
| JP | 2002024404 A | 1/2002 | |
| JP | 2003067132 A | 3/2002 | |
| JP | 2002264879 A | 9/2002 | |
| JP | 2002310679 A | 10/2002 | |
| JP | 2002357438 A | 12/2002 | |
| JP | 2003123192 A | 4/2003 | |
| JP | 2003168194 A | 6/2003 | |
| JP | 2003331063 A | 11/2003 | |
| JP | 2004037413 A | 2/2004 | |
| JP | 2004085301 | 3/2004 | |
| JP | 2004085511 A | 3/2004 | |
| JP | 2004118410 A | 4/2004 | |
| JP | 2004138474 A | 5/2004 | |
| JP | 2004233058 A | 8/2004 | |
| JP | 2004350947 A | 12/2004 | |
| NL | 1134555 A1 * | 9/2001 | ........... G01C 21/165 |
| WO | 9949279 A1 | 9/1999 | |
| WO | 00/33031 A1 | 6/2000 | |
| WO | 0142809 A2 | 6/2001 | |
| WO | 0188477 A2 | 11/2001 | |
| WO | 02055959 A1 | 7/2002 | |
| WO | 02055960 A1 | 7/2002 | |
| WO | 2005017459 A1 | 2/2005 | |

OTHER PUBLICATIONS

International Search Report issued in corresponding PCT Application, International Application No. PCT/US2005/044753 mailed Jul. 21, 2006, 10 pages.

Extended European Search Report issued in corresponding EPO Application, Application No. 11155502.5, issued May 17, 201, 6 pages.

Extended European Search Report issued in corresponding EPO Application, Application No. 11155505.8, issued May 17, 2011, 6 pages.

Extended European Search Report issued in corresponding EPO Application, Application No. 11155506.6, issued May 17, 2011, 6 pages.

Extended European Search Report issued in corresponding EPO Application, Application No. 11155507.4, issued May 18, 2011, 6 pages.

Extended European Search Report issued in corresponding EPO Application, Application No. 11155508.2, issued May 18, 2011, 6 pages.

Extended European Search Report issued in corresponding EPO Application, Application No. 11155509.0, issued May 19, 2011, 5 pages.

* cited by examiner

MULTI-SENSOR MONITORING OF ATHLETIC PERFORMANCE

RELATED APPLICATION DATA

This application is a continuation of co-pending U.S. patent application Ser. No. 13/312,684, filed Dec. 6, 2011, which is a continuation of U.S. patent application Ser. No. 12/770,355, filed Apr. 29, 2010, now U.S. Pat. No. 8,086,421, which is a continuation of U.S. patent application Ser. No. 12/552,958, filed Sep. 2, 2009, now U.S. Pat. No. 8,112,251, which is a continuation of U.S. patent application Ser. No. 11/769,545, filed Jun. 27, 2007, now U.S. Pat. No. 7,603,255, which is a continuation of U.S. patent application Ser. No. 11/014,241, filed Dec. 17, 2004, now U.S. Pat. No. 7,254,516. All of the prior applications and patents are each entirely incorporated herein by reference.

FIELD OF THE INVENTION

The invention relates generally to athletic performance monitoring systems and methods. As least some examples of athletic performance monitoring systems and methods according to the invention utilize global positioning satellite data ("GPS data") to provide data and information to the athlete and/or to equipment used by the athlete, optionally before, during, and/or after an athletic performance (e.g., an athletic event, practice, workouts, training sessions, etc.).

BACKGROUND

Increasing awareness of health benefits derived from physical exercise and participation in athletic events has spawned an increase in the numbers of individuals engaged in these activities. Many individuals train or work out in clubs or indoor gyms using exercise equipment that include various sensors for measuring physical and/or physiological parameters associated with the user's workout. For example, treadmills, elliptical trainers, stair steppers, stationary bicycles, and the like often provide electronic devices that measure or estimate various physical and/or physiological parameters associated with a workout or training exercise, such as the distance traveled, the elapsed time of the exercise, the altitude climbed, the inclination level, the movement rate (e.g., miles per hour, etc.), the heart rate, the power expended, the calories burned, the rate of calories burned, etc. In some gyms or clubs, data relating to an individual's workout may be transmitted automatically from the exercise equipment directly to a computer system and stored. Athletes, their trainers, and/or their coaches may gain access to this data, e.g., for post-workout analysis, to gauge progress or improvement, to develop future workout routines or plans, etc.

Some athletic workouts, training routines, or events simply do not lend themselves to the use of indoor gyms and/or stationary exercise equipment of the type described above. For example, long distance runners (e.g., marathoners), cyclists, triathletes, and the like typically cover long distances during each workout, and they must train over a variety of different terrains and conditions. Such athletes also may quickly become bored when using stationary, indoor exercise equipment for the length of time required to prepare for the events in which they compete. Moreover, some individuals simply prefer being outdoors and working out outdoors as compared to the confinements of an indoor gym or club. Working out individually and outdoors additionally has advantages over use of indoor facilities in that an individual outdoor workout typically will not require club or gym memberships and their associated membership fees, thereby eliminating at least some of the expense involved in keeping fit and participating in athletic events.

While monitors and sensors are available to collect data relating to athletic performance and to provide real time data to athletes as their performance is taking place, such monitors and sensors typically have limitations. For example, accelerometers and other pedometer-based speed and distance monitors for use when walking or running have accuracy issues, particularly when used at speeds and/or over terrains or under other conditions that differ from their initial calibration conditions. Some sensors, such as accelerometers and barometric pressure sensors, tend to drift from their calibration or "zero" point over time, thereby limiting their accuracy and/or requiring frequent recalibration. Such portable devices typically also do not store data and do not correlate their measured data to other measured physical and/or physiological parameters associated with the performance. For example, conventionally available portable devices typically do not correlate the measured heart rate, altitude, speed, calories burned, and the like to one another and/or to the elapsed time and/or distance into the performance, and such conventional systems do not store a large volume of data for later analysis or use. Thus, these conventional portable exercise monitors do not allow for extensive post-exercise analysis and data processing.

Accordingly, there is a need in the art for portable athletic performance monitoring systems and methods that correlate measured physical and/or physiological data associated with an athletic performance to other data collected during the performance including the elapsed time and/or distance in the performance. There also is a need in the art for systems and methods that will automatically store data associated with an athletic performance and make it available to athletes, their coaches, and/or their trainers for post-performance analysis. There also is a need in the art for improved athletic performance monitoring systems and methods that will allow athletes to better use data generated from past performances, e.g., to gauge improvement or change, to set goals for the future, and/or to devise plans and/or strategies for upcoming events.

SUMMARY

The following presents a general summary of aspects of the invention in order to provide a basic understanding of at least some of its aspects. This summary is not an extensive overview of the invention. It is not intended to identify key or critical elements of the invention and/or to delineate the scope of the invention. The following summary merely presents some concepts of the invention in a general form as a prelude to the more detailed description provided below.

Aspects of this invention relate to athletic performance monitoring systems and methods, many of which utilize, in some manner, global positioning satellite ("GPS") data. In some examples of systems and methods according to the invention, GPS data may be used to calibrate other athletic performance monitoring devices, such as speedometers, speed meters, pedometers, altimeters, odometers, barometric pressure sensors, compass or direction sensors, and the like. Some example systems and methods according to aspects of the invention will collect and store data generated by both a GPS system and a non-GPS system during an athletic performance and then use the non-GPS data to provide information and feedback to the athlete during the performance and/or to fill in holes in the data when GPS reception is not available at the athlete's location. Still other systems and methods that collect and store data generated by both GPS and non-GPS systems will utilize the non-GPS data to provide real time feedback to the athlete during the performance and optionally both GPS and non-GPS data for post-performance analysis.

GPS information also may be collected and used in at least some example aspects of the invention to produce data relating the route(s) covered by the athlete during athletic performances. For example, systems and methods according to at least some examples of the invention may rely on GPS data to determine whether a route covered during an athletic performance corresponds to a route covered during one or more previous athletic performances. As another example, systems and methods according to examples of the invention may rely on GPS data (as well as potentially other data) as an aid in assigning a "route difficulty rating" to a route used during an athletic performance, e.g., at least in part based on: route length; elevation changes; altitude; temperature; humidity; wind speed; wind direction; and the like. Yet additional examples of systems and methods according to the invention may rely on GPS data (optionally at an athlete's new location), map data, and/or data relating to one or more past athletic performances to suggest a new route for future athletic performances, e.g., at the new location.

GPS data and/or optionally other data may be used for other purposes in athletic performance monitoring systems and methods according to at least some examples of the invention. For example, GPS data and/or other performance data may be used to control an audio, video, and/or printed information display device during an athletic performance. The GPS and/or other performance data, optionally combined with route information, may be used as an aid to generate time goals for use by the athlete during an athletic performance.

Still additional aspects of the invention relate to the use of GPS and/or other data collected to provide information and feedback to the athlete and/or analyze the athletic performance both during the performance and after it has concluded. For example, systems and methods according to at least some examples of the invention may generate displays illustrating at least some data collected via the altitude measuring system, the other physical and/or physiological performance monitors, and/or the GPS system. Optionally, the information will be displayed on a map or other representation of the route such that the physical and/or physiological data is correlated to the athlete's time, distance, and/or location along a route. In still other examples, the displayed information may be used along with and/or as part of a virtual or animated "play back" of the athlete's performance.

BRIEF DESCRIPTION OF THE DRAWINGS

A more complete understanding of the present invention and certain advantages thereof may be acquired by referring to the following description along with the accompanying drawings, in which like reference numbers indicate like features, and wherein.

DETAILED DESCRIPTION

Figure 1:
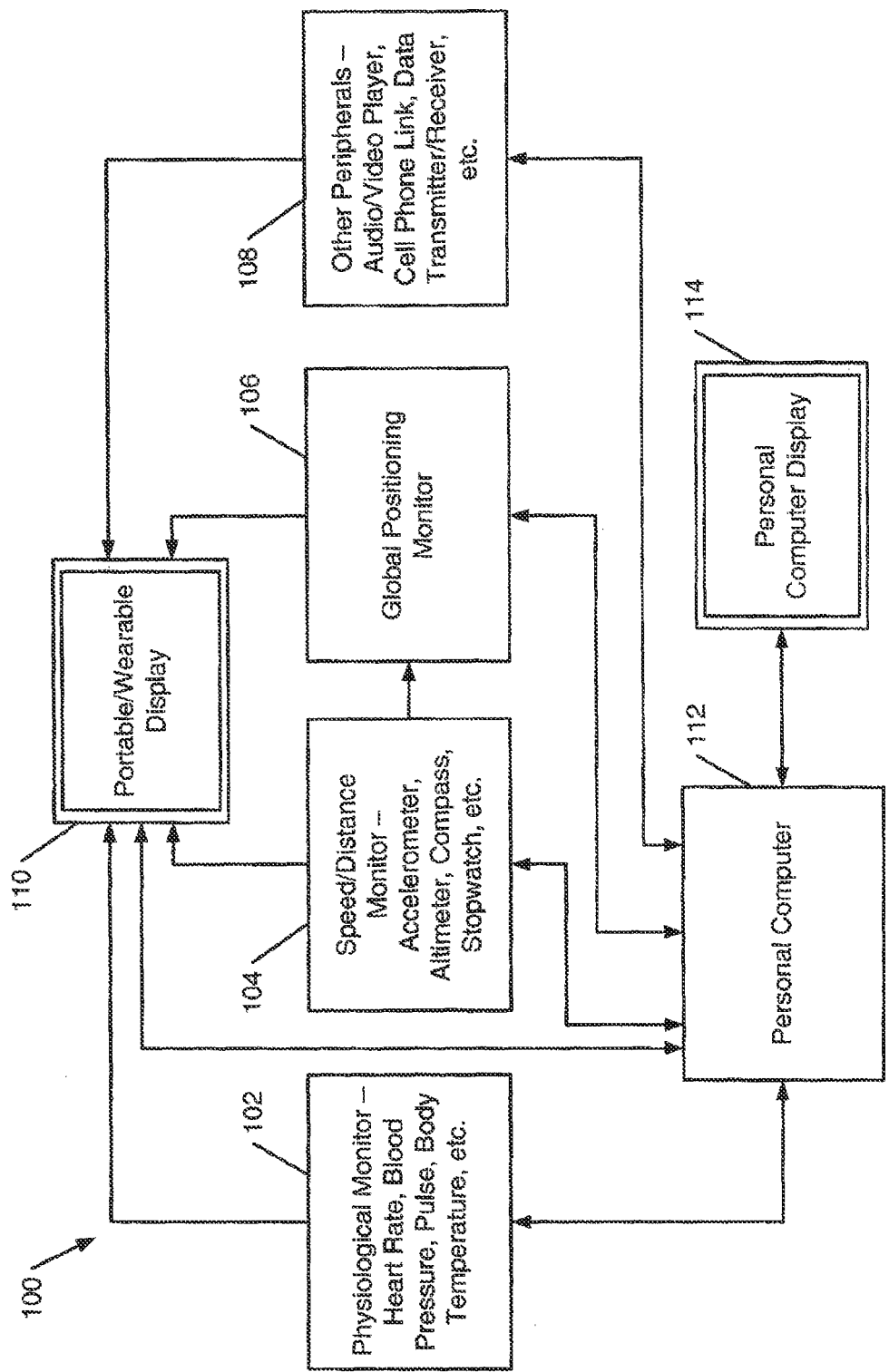
FIG. 1 illustrates a schematic diagram of an example system according to the invention.

In the following description of various example embodiments of the invention, reference is made to the accompanying drawings, which form a part hereof, and in which are shown by way of illustration various example devices, systems, and environments in which aspects of the invention may be practiced, and various examples of the manner in which data may be processed and/or displayed in examples of the invention. It is to be understood that other specific arrangements of parts, example devices, systems, and environments may be utilized, different analyses and displays may be generated, and structural and functional modifications may be made without departing from the scope of the present invention.

To assist the reader, this specification is broken into various subsections, as follows: Terms; General Description of Athletic Performance Monitoring Systems and Methods According to Examples of the Invention; Specific Examples of the Invention; and Conclusion.

A. Terms

The following terms are used in this specification, and unless otherwise noted or clear from the context, these terms have the meanings provided below.

"Performance" or "athletic performance" means any type of physical exertion or activity. Such activities include, but are not necessarily limited to: workout routines; training exercises; time trials; formal competitions; informal workouts; etc. The terms "athletic event" or "event" may be used synonymously with "athletic performance" or "performance" in this specification.

"Physical data" relating to an athlete's performance corresponds to any data associated with or relating to any measurable characteristic relating to the performance. Such physical data includes, but is not limited to: physiological data (described in more detail below); elapsed time; time of day; distance covered; number of steps taken; speed; acceleration; angular velocity; angular acceleration; altitude; barometric pressure; gyroscope generated data; heading or directional data; ambient temperature data; ambient humidity data; wind direction data; wind speed data; etc.

"Physiological data" relating to an athlete's performance corresponds to any data associated with or relating to any measurable characteristic relating to the athlete's person or body. Such physiological data includes, but is not limited to:

heart rate; pulse rate; calories burned; calorie burn rate; METs; body weight; body temperature; blood pressure; electrocardiogram data; etc.

B. General Description of Athletic Performance Monitoring Systems and Methods According to Examples of the Invention In general, aspects of this invention relate to athletic performance monitoring systems and methods that include various features or functions. Some more specific example aspects of the invention relate to athletic performance monitoring systems that utilize, in some manner, global positioning satellite ("GPS") data. In one example, aspects of the invention relate to athletic performance monitoring systems that include: (a) a global positioning satellite receiver that obtains data relating to a series of time-stamped position points; (b) a first athletic performance monitor that measures physical data relating to an athlete's performance; and (c) means for generating calibration data for the first athletic performance monitor based on data obtained via the global positioning satellite receiver. As examples, the global positioning satellite data may be used to calibrate athletic performance monitoring devices such as: speedometers, pedometers, altimeters, odometers, barometric pressure sensors, compass or direction sensors, and the like. The calibration data may be provided, in at least some instances, as one or more "correction factors" that may be applied to a measured parameter, optionally where the specific correction factor to be used is selected based on one or more of the other measured parameters during the athletic performance.

Another example aspect of the invention relates to athletic performance monitoring systems that include: (a) a global positioning satellite receiver that obtains data relating to a series of time-stamped position points; (b) a first athletic performance monitor that provides data relating to at least one of a speed or a distance moved by an athlete during an athletic performance; (c) a second athletic performance monitor that provides data relating to a direction in which the athlete moves during the athletic performance; and (d) means for storing data relating to the athletic performance, wherein the means for storing stores data collected via the first and second athletic performance monitors when global positioning satellite reception is not available.

Further examples of this invention relate to other athletic performance monitoring systems that utilize GPS data. Another more specific example of the invention relates to athletic performance monitoring systems that include: (a) a global positioning satellite receiver that obtains data relating to a series of time-stamped position points; (b) a first athletic performance monitor that provides data relating to at least one of a speed or a distance moved by an athlete during an athletic performance; (c) means for storing data relating to the athletic performance collected via the global positioning satellite receiver and the first athletic performance monitor; (d) means for displaying information associated with the athletic performance during the performance using data collected via the first athletic performance monitor and not using data collected via the global positioning satellite receiver; and (e) means for analyzing and displaying information associated with the athletic performance when the performance is no longer taking place, wherein the means for analyzing and displaying information uses at least data collected via the global positioning satellite receiver.

GPS information and/or map data may be used in at least some example aspects of the invention to collect data relating to the route(s) covered by the athlete during an athletic performance. One example relates to athletic performance monitoring systems that include: (a) a global positioning satellite receiver that obtains data relating to a series of time-stamped position points encountered during an athletic performance; and (b) means for determining whether a route covered during the athletic performance corresponds to a route covered during a previous athletic performance. As another example, athletic performance monitoring systems according to at least some examples of the invention may include: (a) a global positioning satellite receiver that obtains data relating to a series of time-stamped position points encountered during an athletic performance; and (b) means for assigning a route difficulty rating to a route used during the athletic performance, at least in part based on at least one of: route length; elevation changes over the route; altitude of the route; temperature during the athletic performance; humidity during the athletic performance; wind speed during the athletic performance; and wind direction during the athletic performance. Yet another example athletic performance monitoring system may include: (a) a global positioning satellite receiver that obtains data relating to a series of time-stamped position points encountered during an athletic performance; (b) means for storing data associated with one or more routes utilized by an athlete during a plurality of athletic performances; and (c) means for suggesting a new route for a future athletic performance, wherein the means for suggesting the new route determines the new route, at least in part, by comparing data associated with the new route's location with the stored data associated with the routes utilized by the athlete during at least some of the stored plurality of athletic performances.

GPS data may be used for still other purposes in athletic performance monitoring systems according to at least some examples of the invention. For example, such systems may include: (a) a global positioning satellite receiver that obtains data relating to a series of time-stamped position points encountered during an athletic performance; (b) means for controlling an audio, video, or other display device during the athletic performance based, at least in part, on data obtained via the global positioning satellite receiver; and, optionally, (c) an audio, video, or other device for providing audio, video, printed, or other information to an athlete during the athletic performance.

Still additional athletic performance monitoring systems according to at least some examples of the invention may include: (a) an altitude measuring system that obtains data relating to an altitude at an athlete's location as an athletic performance is taking place; (b) a first athletic performance monitor that provides data relating to at least one of a speed or a distance moved by the athlete; (c) a second athletic performance monitor that provides physiological data relating to the athlete's performance (e.g., heart rate; pulse rate; blood pressure; and/or body temperature); (d) means for storing data relating to the athlete's performance, wherein the means for storing stores at least some data collected via the altitude measuring system, the first athletic performance monitor, and the second athletic performance monitor; and (e) means for displaying at least some data collected via the altitude measuring system, the first athletic performance monitor, and the second athletic performance monitor in a time or distance correlated manner.

Additional example aspects of the invention relate to systems that analyze and/or process data collected during an athletic performance. Examples of such systems may include: (a) means for receiving input data relating to an athletic performance; and (b) means for displaying information relating to the athletic performance, wherein the information displayed correlates at least one physical characteristic of the athletic performance to time, distance, or location along a route used during the athletic performance, and wherein the information displayed correlates at least one physiological characteristic of the athletic performance to time, distance, or location along the route used during the athletic performance. Another example of such systems may include: (a) means for receiving input data relating to a route to be used during an upcoming athletic event, wherein the input data includes information for producing an actual or animated view of the route; (b) means for receiving input data relating to an athletic performance during the athletic event; and (c) means for simultaneously displaying information from the input data relating to the route and from the input data relating to the athletic performance so as to provide data play back of the athletic performance during the athletic event over the route of the athletic event.

Still additional example aspects of the invention may relate to use of athletic performance monitoring systems according to the invention to assist the athlete's participation in the event. Such systems may include, for example: (a) means for receiving input data relating to a route to be used during an athletic event, wherein the input data includes at least distance and route difficulty data relating to the route; (b) means for receiving input data relating to a target time or timing goal for all or a portion of the athletic event; and (c) means for calculating plural time goals along the route or for portions of the route using the input data relating to the route and the input data relating to the target time or timing goal so that the athlete will meet the input target time or timing goal for the athletic event if the time goals are met.

Still additional aspects of the invention relate to methods for monitoring athletic performance, e.g., using various athletic performance monitoring systems including those described above (and the more specific systems described below in more detail). Additional aspects of the invention relate to computer-readable media including computer-executable instructions stored thereon for operating the various systems and performing the various methods described above.

Specific examples of the invention are described in more detail below. The reader should understand that these specific examples are set forth merely to illustrate examples of the invention, and they should not be construed as limiting the invention.

C. Specific Examples of the Invention

The various figures in this application illustrate athletic performance monitoring systems and methods according to various examples of this invention.

1. General Description

Aspects of this invention relate to systems and methods that athletes and/or their trainers or coaches may use to prepare for, monitor, and/or evaluate athletic performances. At least some systems and methods according to examples of the invention utilize global positioning satellite ("GPS") data in some manner to provide data and information to athletes, their trainers, their coaches, and/or to equipment used by athletes before, during, and/or after an athletic performance.

FIG. 1 illustrates an example system 100 that may be used to collect data and provide information to athletes, their trainers, and/or coaches, before, during, and/or after an athletic performance. Such systems 100 may include both hardware that may be worn or carried by the athlete and/or his/her equipment during the athletic performance (e.g., to collect data relating to the athletic performance), and software, optionally that runs on a personal computer 112, that may be used, for example, to prepare for upcoming performances and/or to analyze past performances. Various features of such performance monitoring systems and methods are described in more detail below.

Systems 100 and methods according to examples of the invention may include one or more devices that collect data relating to and/or during the athletic performance. As examples, systems 100 and methods according to the invention may include one or more physiological monitors 102 that monitor one or more physiological characteristics associated with the athlete's performance. Any suitable or desired physiological monitor 102 may be used without departing from the invention, such as a heart rate monitor, a pulse monitor, a blood pressure monitor, a body temperature monitor, an electrocardiogram monitor, etc. In addition, or alternatively, systems 100 and methods according to at least some examples of the invention may collect and utilize data generated by one or more physical performance monitors 104, such as a speed/distance monitor or other type of speedometer, a pedometer, an accelerometer (for measuring linear or angular acceleration), an altimeter, a gyroscope (for measuring rotation rate), a gyroscope position monitor (for measuring relative angular position), a compass (e.g., a magnetic compass), an ambient pressure sensor (e.g., barometric pressure), a wind speed monitor, a wind direction monitor, an air temperature measuring device, a humidity measuring device, a stopwatch or other timing device, and the like. At least some portion of the physical monitor(s) 104 and/or the physiological monitor(s) 102 may be carried on or by the athlete and/or his/her equipment during the performance.

Furthermore, systems 100 and methods according to at least some examples of this invention will utilize data and information relating to an athletic performance collected by or provided via a global positioning monitor or system 106. As is conventionally known, GPS systems monitor the locations of persons and/or objects on earth using a series of orbiting GPS satellites. In addition to providing data relating to the absolute latitudinal and longitudinal position coordinates of a GPS receiver, data provided via GPS systems may be adapted and used to provide information regarding elapsed time during a performance, distance moved, elevation or altitude at a specific location, elevation changes over time, movement direction, movement speed, and the like. At least some portion of the GPS monitoring system 106 may be carried by the athlete and/or his/her equipment during the athletic performance.

Systems 100 and methods according to at least some examples of this invention further may include other peripheral devices 108 that may be used before, during, and/or after an athletic performance. Such peripheral devices 108 may include, for example, an audio or video player, e.g., to provide entertainment or other information to the user; a cell phone and/or its associated voice, data transmission, and/or reception equipment; a system for delivering printed or textual information, such as a beeper or pager type device; other data transmission and reception equipment; and the like. The peripheral equipment 108 further may be carried by the athlete and/or his/her equipment during the athletic performance, and it further may include equipment such as headphones, earpieces, microphones, goggles, and the like, to enable transmission of information to and/or receipt of information from the athlete (or others).

For use at least while the athletic performance is taking place, systems 100 and methods according to at least some examples of the invention may include a portable and/or wearable display device 110. This display device 110 may take on any suitable or desired form without departing from the invention. For example, it may be a digital display device, an audio display device, a video or pictorial display device, an alphanumeric display device (e.g., for displaying printed text), a head worn display device, an arm/wrist worn display device (e.g., a watch or similar device), a clip-on display device (akin to a beeper, cell phone, or the like), etc. Additionally, an athlete (and/or his/her equipment) may carry more than one display device 110, if desired, and/or a single display device 110 may provide information in many different forms or formats from plural sources without departing from the invention, such as in the various forms and from the various sources described above. The portable/wearable display device 110 may be embodied in and/or akin to a conventional watch, PDA, MP3 player, cell phone, beeper, pager, or the like. The display device 110 also may provide "real time" data to the athlete as the performance is taking place, e.g., data from any of the various sensors or other sources, optionally along with other information, such as messages from a coach or trainer, updated timing or other goal information, weather information, data or information generated by processing the previously generated performance data, calibration and/or correction factor information for one or more of the sensors, etc.

In addition to providing real time information while an athletic performance is taking place, systems 100 and methods according to examples of the invention may provide information both before and/or after the athletic performance takes place. For example, systems 100 and methods according to examples of the invention may operate in conjunction with a personal computer 112, such as a laptop computer, a palmtop computer, a pocket-sized personal computer, a desktop computer, and the like. The personal computer 112 may provide information or data to the various monitoring systems and/or other devices (e.g., devices 102, 104, 106, 108, and 110), and it also may receive data and information from these devices 102, 104, 106, 108, and 110. This transfer of data and information may occur in any desired manner without departing from the invention, including, for example, via cell phone link technology, radio transceiver technology, satellite technology, wired or wireless computer network connections, and/or in any other manner, including in conventional manners known in the art. Additionally and/or alternatively, the stored data may be uploaded to a website either during the athletic performance and/or at a later time, e.g., using cell phone technology, wired or wireless computer network connections, satellite transmissions, or other means.

Before an athletic performance, the personal computer 112 may be used in many different ways and for many different purposes in accordance with examples of the invention. For example, the computer 112 may be used to determine a route to be used by the athlete, e.g., if the athlete is traveling or would like a different route at his/her home location. As another example, computer 112 may be used by the athlete, trainer, or coach, potentially in combination with map or topographical information, to consider overall route information for an athletic event and devise a strategy for that event (e.g., to determine timing goals, benchmark or landmark times, split times, etc.). Route and/or other data or information may be presented to the athlete, trainer, coach, etc., via the computer display screen 114. In at least some instances, the display screen 114 may present the same information as that shown on or presented by the portable/wearable display 110. Optionally, if desired, a single device may perform the functions of both the portable/wearable display 110 and the display screen 114 without departing from the invention.

Data collected by one or more of the various monitors, e.g., 102, 104, 106, and 108, during the course of an athletic performance may be transmitted to the portable display device 110 and/or to the personal computer 112, either during and/or after the performance. As will be described in more detail below, if desired, portable portions of the system 100 may include memory that stores data associated with the athletic performance, and this data later may be downloaded to the personal computer 112 (e.g., after the performance has finished), for more detailed processing and/or analysis, e.g., to assist the athlete, trainers, and/or coaches to evaluate past performances, to compare performances, to assist in improving future performances, to devise training regimes, to devise strategies for an approaching event, etc. As another example, if desired, one or more of the portable components of the system 100 (e.g., a peripheral device 108, such as a cell phone link or other data transmission device) may transmit data to the personal computer 112 while the athletic performance is taking place and/or it may receive data from the computer 112 while the event is taking place (e.g., with updated split or lap times, landmark or other location information, position information relating to other competitors, etc.).

More specific examples of sensors, data, and information used by and/or collected in various examples of systems and methods according to the invention follow.

2. Multi-Sensor Systems

Several examples of systems and methods according to the invention rely on and/or receive input data relating to an athletic performance from a plurality of sensors, e.g., such as from physiological performance monitor(s) 102, physical performance monitor(s) 104, a GPS monitor 106, and/or other peripheral devices 108 as illustrated in FIG. 1. The hardware worn or carried by the athlete and/or his/her equipment during the athletic performance (e.g., during a run, race, etc.) may include one or more modules or pods that contain one or more of the desired sensors. These modules preferably are battery-powered, optionally using rechargeable batteries, and in at least some example systems and methods according to the invention, the modules, pods, and/or sensor(s) may include:

A watch, PDA, MP3, cell phone, or other convenient display device;
A Heart Rate Monitor;
A "speed pod" for measuring speed and/or distance, e.g., worn on the foot, leg, or other body part;
A GPS pod; and
Other peripherals, such as a cell phone link, audio player, etc.

Notably, any combination of these sensors and other elements may be included in a single housing. For example, a foot pod housing may contain both the GPS and accelerometer sensors, if desired, or alternatively, the GPS sensor may exist in its own pod. As another example, the display device additionally may include a magnetic compass, a pressure sensor, or other elements.

In systems and methods according to at least some examples of the invention, complementary sensor groups may be used in combination to overcome the various shortcomings of the individual sensors. For example, a GPS system alone could provide much of the physical data of interest for monitoring an athletic performance, but GPS systems suffer from deficiencies in that they consume significant power (thereby shortening battery life), and they cannot provide information at all times and/or at all locations (i.e., they do not have 100% antenna coverage). Therefore, systems and methods according to at least some examples of the invention will include additional sensors (and in some instances redundant sensors) to assure that the desired athletic performance data is collected and available, e.g., even when some individual systems are not available (for example, when a GPS system cannot get a signal and/or in instances where power savings is important). More detailed examples of complementary groupings of sensors are described below.

a. Combined GPS and Accelerometer-Based or Other Pedometer-Based Speed and Distance Monitor One example of a complementary grouping of sensors that may be included in systems according to the invention relates to the combined use of a GPS monitoring system and an accelerometer-based or other pedometer-based speed and distance monitor. Conventional GPS systems suffer from satellite outages at various times and/or locations, e.g., around trees, tall buildings, indoors, whenever the antenna is blocked, etc. Additionally, there typically is a relative slow "warm start" or "cold start" satellite acquisition time when a GPS system initially is powered on. GPS systems also tend to use substantial electrical power to take a reading. Accelerometer-based or other pedometer-based speed and distance monitoring systems, on the other hand, suffer from inherent system inaccuracy (e.g., due to sensor drift, mounting errors, and/or the fact that typically three orthogonal axes of acceleration are not sensed). Additionally, accelerometer-based or other pedometer-based speed and distance monitoring systems are incapable of providing absolute position and/or altitude information. Typically, accelerometer-based or other pedometer-based speed and distance monitors are calibrated for a particular user and/or mounting position, which increases the difficulty of their use and deters from their accuracy under a wide range of use conditions.

Using an athletic performance monitoring system that combines a GPS monitor and an accelerometer-based or other pedometer-based speed and distance monitor according to at least some examples of this invention provides many potential advantages and avoids or lessens the impact of the disadvantages inherent in each system. For example, the GPS system (and its absolute position detecting capability) may be used to calibrate an accelerometer-based or other pedometer-based speed and distance monitor. Conventionally, users calibrate existing accelerometer-based or other pedometer-based speed and distance monitors by running or walking a known distance, for example, on a level track. Once the known distance has been covered, the user looks at the measured speed and distance monitor distance results and sees what that monitor has determined to have been covered (e.g., the monitor may determine that the user moved 410 meters (e.g., based on step length) when he/she actually ran around a 400 meter track). The user then corrects the speed and distance monitor output by pressing buttons to correct the measured length to match the known length and thereby setting an internal correction factor within the device. This correction scheme is highly prone to errors, for example, because a user's step size typically changes when running, jogging, or walking. In addition, a user's step size may change depending on the conditions of the exercise, e.g., when moving uphill, downhill, into the wind, against the wind, at different altitudes, at changing altitudes, at different speeds, etc.

By using GPS-assisted calibration, calibration of an accelerometer-based or other pedometer-based speed and distance monitor may take place over any distance, and/or at any location (as long as there is GPS satellite coverage available). As noted above, users typically calibrate accelerometer-based or other pedometer-based systems at one outing on a level track. In accordance with at least some examples of the invention, information collected by the GPS satellite monitoring device may be used to generate correction factors and/or calibration data for use by the accelerometer-based or other pedometer-based speed and distance monitor. More specifically, because the GPS system is capable of measuring the absolute distance moved by an athlete as well as the time required and/or altitude changes made over the course of movement, the GPS-generated data may be used to determine correction factors or calibration data usable by an accelerometer-based or other pedometer-based speed and distance monitor. GPS-based calibration or collection of data for calibration or correction purposes according to this example of the invention may be performed at any time, optionally in background during actual use of the athletic performance monitoring system and/or without the user even being aware of it. As another option or alternative, if desired, an athlete could press a button on the portable portion of the monitoring system or otherwise command the system to collect calibration or correction data. The use of GPS data to calibrate and/or generate correction factors for accelerometer-based or other pedometer-based speed and distance monitors simplifies the calibration of these devices (e.g., there is no need to make a special trip to the track and/or to lay out a precisely measured distance to enable calibration) and improves their accuracy.

Additionally or alternatively, in at least some examples of systems and methods according to the invention, GPS-based calibration and/or generation of correction factor data for an accelerometer-based or other pedometer-based speed and distance monitor may be performed under a variety of different use conditions, e.g., calibration data or correction factors may be generated for use at different movement speeds, for use when moving uphill, for use when moving downhill, for use at different wind speeds, for use under different wind directions, for use under any specific type of conditions during which a user's step size may change, etc. Moreover, this variety of correction factors and/or calibration data may be collected, in the background, over time, as the athlete continues using the athletic performance monitoring system. In this manner, a "lookup table" or other "universe" or library of calibration data or correction factors may be built up and stored in the monitoring system (optionally in the portable portion of the system), such that an appropriate correction factor could be generated and applied for a full range of athlete speeds and/or other use conditions. A microprocessor provided with the system (optionally in the portable portion of the system, in the personal computer, etc.) may be programmed to interpolate between and/or extrapolate from known calibration or correction factors to arrive at the most appropriate calibration or correction factor for use at any speed or other use condition(s). Also, in this manner, different calibration or correction factors may be applied at different times during a single athletic performance, e.g., based on the speed or other use conditions determined at a given time during the performance, to further help improve the overall accuracy of the speed and distance monitor. By having a variety of correction or calibration factors available under different performance conditions, the speed and distance monitor output will tend to become more accurate, particularly over time and with increased use, because of the increased number of calibration and correction factors generated with increased use.

Accordingly, use of GPS generated data to produce calibration and correction factors for a pedometer-based speed and distance monitor will make the pedometer data more accurate, particularly when the monitor is used under a variety of different conditions (e.g., at different speeds, under different wind or terrain conditions, etc.). In this manner, when the GPS system loses its signal and/or at any other appropriate or desired times during the athletic performance when GPS output is not sampled, a relatively low cost pedometer may be relied upon to accurately fill in the missing speed and distance data.

Additionally or alternatively, because accelerometer-based or other pedometer-based speed and distance monitor systems typically do not require as much battery power as that required in obtaining a reading from a GPS-based system, the accelerometer-based or other pedometer-based speed and distance monitor may be sampled more frequently to save power. Additionally, data from accelerometer-based or other pedometer-based speed and distance monitors can be obtained quickly and more often to thereby provide more "responsive" instantaneous speed change information to the user. Accelerometer-based or other pedometer-based speed and distance monitors also can provide some information that is not available from a GPS-based system, such as step count.

As still another example, in systems and methods according to at least some examples of the invention, it may be desirable to provide athletic performance monitoring systems and methods that derive all "real time" speed and distance information (e.g., the information displayed to the athlete on the portable display device during the performance) from the accelerometers or pedometers, and not using the GPS to provide the real time information. In such systems, the GPS monitor may operate periodically, in the background, e.g., logging position and altitude tracking point data in a memory. After the performance is completed (e.g., after the data relating to the performance is downloaded to the personal computer), the GPS data, optionally along with the data from the pedometer-based speed and distance monitor, may be used for analysis (optionally along with other map data, altitude data, and/or other input information). In such systems, the GPS data may be sampled less frequently, thereby saving power, while still providing continuous and sufficiently accurate speed and distance information to the athlete in real time from the accelerometer or other pedometer based system, because the accelerometer or other pedometer based system is not susceptible to antenna or transmission/reception problems.

b. Combined GPS or Other Speed and Distance Monitors with Barometric Pressure Sensors Another example of a complementary grouping of sensors that may be included in a single system according to at least some examples of the invention relates to the combined use of a GPS monitoring system (or an accelerometer or pedometer based speed and distance monitor) with a barometric pressure sensor. While barometric pressure sensors can determine barometric pressures at different locations (e.g., as an athlete moves) and/or pressure changes over time and/or over movement, and while such barometric pressures can be correlated to altitude, a barometric pressure sensor alone cannot distinguish between various potential sources of changes in pressure. For example, barometric pressure sensors cannot identify whether pressure changes occur due to weather and/or atmospheric condition changes, due to changes in user altitudes, etc. While GPS systems, at least in some examples, provide altitude data, this altitude data typically may be somewhat inaccurate. Conventional GPS systems do not monitor weather.

Monitoring systems that include both GPS and barometric pressure sensors may allow more accurate determination of whether an experienced barometric pressure change is due to an altitude change or a weather change. For example, if the GPS system indicated that an athlete had not moved or otherwise changed altitude, then the system could attribute all barometric pressure change to weather-related changes (and optionally warn the user of possible approaching weather changes). This combined system would make weather predictions during an athletic performance much more accurate. The opposite effect also is true. A barometric pressure sensor based altimeter could provide much more accurate altitude data if data from the GPS system (which has some altitude measurement capabilities) allowed the pressure sensor system to determine pressure changes due to weather.

Moreover, currently available barometric pressure based altitude sensors must be calibrated. The use of such a sensor in combination with a GPS system, however, may eliminate the need for a user to perform this calibration. For example, altitude data from the GPS system could be used, when available or occasionally, to calibrate an altitude determined by a barometric pressure based altitude sensor. Additionally or alternatively, using the distance of movement or altitude change data determined by a GPS system, calibration data or "zero drift" correction data for the barometric pressure sensor may be generated. The calibration data may be collected and/or used in the background, without active interaction by the users. In these manners, the GPS data can help zero the drift typically experienced by barometric pressure sensors and thereby make their output more accurate.

Complementary combinations of devices do not require GPS sensors, at least not in all examples of the invention. Accelerometer-based or other pedometer based speed and distance monitors also may be used in combination with barometric pressure sensors in a similar manner. For example, if the speed and distance monitor indicates that the user has not moved a significant distance (or at all), but a pressure change is detected by the system, this pressure change may be attributed to weather changes and not altitude changes. Such information also may be used, in at least some instances, to correct or "zero" the drift typically experienced by barometric pressure altitude sensors, thereby making their output more accurate.

c. Combined GPS with Bicycle (or Other) Speedometers

Athletic performance monitoring systems and methods according to examples of this invention are not limited to use with running or walking type athletic performances (e.g., performances in which data may be collected using a pedometer). Another example of a complementary grouping of sensors that may be included in a single system or method according to the invention relates to the combined use of a GPS monitoring system with a conventional speedometer, such as one on a bicycle. A conventional speedometer provides accurate speed and distance data, but it does not provide altitude or absolute position information. A GPS system, on the other hand, provides speed, distance, altitude, and absolute position information, but as described above, it occasionally suffers outages due to loss of satellite signal, it consumes substantial battery power, and the like. A combination of these systems may be used to provide speed, distance, altitude, and position data, and the speedometer may be relied upon to provide the athlete with speed and distance information, e.g., when the GPS system is not getting a signal, etc. Additionally, if desired, the GPS system could be used sparingly or periodically, to save battery power, and the speedometer system could be used constantly (or at least more frequently) to provide the athlete with real time speed and distance information. If desired, systems and methods according to some examples of the invention may simply store all GPS data during the performance for later download, analysis, etc.

If desired, systems and methods according to this example combination of the invention also may use the GPS data to provide calibration data and/or correction factors for use of the speedometer, optionally under a variety of different use conditions, e.g., like those described above, under different tire pressure conditions, different tire size conditions, etc.

d. Combined GPS, Speed and Distance Monitor, and Magnetic Compass

As mentioned above in conjunction with FIG. 1, any number of sensors may be used in combination without departing from the invention. Another example of a complementary grouping of sensors that may be included in a single system or method according to the invention includes the combined use of a GPS monitoring system, an accelerometer or other pedometer-based speed and distance monitor, and a magnetic compass.

In conventional GPS systems, when the GPS receiver misses tracking points (e.g., because the receiver is blocked, power outage, etc.), the data collected produces a straight line between the consecutively known GPS sampling points irrespective of the actual direction that the GPS receiver moved during this time period. By combining the data produced by an accelerometer or other pedometer-based speed and distance monitor with data produced via a magnetic compass, systems and methods according to this example of the invention are able to more accurately determine the absolute location of an athlete even when the GPS signal or data is lost for any reason. Using the speed and distance monitor data and the compass data, the system can continue to provide speed, distance, and heading data. Therefore, when/if the GPS receiver loses its signal (or if the signal is not taken at some times, e.g., due to power saving reasons), the athletic performance monitoring system and method according to this example still can use the other sensors' output to determine the changes in the athlete's position to fill in the "holes" and provide actual athlete path data until the GPS signal is regained or otherwise again sampled.

e. Combined Speed and Distance Monitor (from GPS, Accelerometer, or Other Pedometer), Altitude (from GPS, Barometer, or Map Data), and Heart Rate Monitor Another example of a combination of complementary sensors that may be used in athletic performance monitoring systems and methods according to at least some examples of the invention includes a combined altitude sensor (GPS or barometric pressure based), heart rate monitor, and speed and distance monitor (GPS, accelerometer, or other pedometer based). Currently available heart rate monitors display "real time" heart rate data and may store at least some data in memory for future analysis. Some currently available systems additionally may store at least some speed and/or distance data. One important missing piece of data is altitude. Upon reviewing stored data, an athlete, trainer, or coach may find that the athlete's heart rate had risen and/or that his/her speed had slowed, but currently they would not be able to determine from the stored data if these facts were the result of a physiological symptom, or if the athlete actually ascended a steep hill, or the like. By combining altitude data with heart rate and speed and distance data, an athlete, trainer, or coach can obtain a more complete picture of the athlete's workout regime and better ascertain the physical reasons behind changes in heart rate, pace, etc.

3. Example Software/Data Processing Aspects

Various aspects of systems and methods according to examples of this invention relate to features of software that may be used to operate the systems, control the methods, and/or process the collected data. Although the discussion below focuses on data analysis using a personal computer and application programs stored or available on a personal computer, those skilled in the art will recognize that any or all of this analysis may take place on any suitable or desired device, such as devices having a display, including cell phones, audio players (e.g., MP3 players, cassette players, CD players, and the like), PDAs, watches, bike mounted displays, televisions, and the like.

Systems and methods according to examples of the invention that include a GPS monitor may use an automatic route recognition and logging feature. As described above, GPS systems are available to track various position or location waypoints of a GPS receiver along a route moved by an athlete during an athletic performance. After a workout, e.g., when an athlete synchronizes the portable portions of the monitor system's hardware with the personal computer, if necessary, the GPS waypoints from the stored performance(s) are downloaded from the portable device's memory to the personal computer (e.g., if desired, systems and methods according to some examples of the invention may allow more than one route to be saved on the portable device (representing more than one athletic performance) between downloads to the personal computer). Software on the personal computer may attempt to correlate the routes used during the performance(s) (e.g., the position or location point datasets) to previous routes stored on the personal computer, e.g., data representing routes that have already been covered by the athlete (or another), stored on the personal computer, and labeled.

As a more specific example, an athlete may run around a local lake several times a week. The first time the athletic performance monitoring system according to this example of the invention is used on this "lake run," the collection of GPS tracking points that comprise the run will be stored on the personal computer and may be labeled by the user, e.g., "lake run." The next time the athlete runs the "lake run" or another run using the performance monitoring system, software on the personal computer will compare the waypoints of that run with waypoints on all the stored routes on the personal computer to determine if there is a match (e.g., it will attempt to find any close matches in the routes). The software then will appropriately label or catalog the most recently run route(s) in the athlete's run log or calendar (optionally after the user confirms that the correct route identification was assigned to the recently run route(s)). The software also will recognize any new routes or routes that fail to match routes in the existing library, and ask the user to enter a name either from the existing route list or as a new route for inclusion on the route list. Such systems and methods allow users to quickly populate a run calendar or log with meaningful run names for the various routes they use.

Another example software/data processing aspect of systems and methods according to at least some examples of the invention relates to the ability to add sensor data to the route concept generally described above. For example, systems and methods according to at least some examples of the invention may allow users to incorporate physical or physiological sensor data into a personal computer database that includes data relating to athletic performances, routes, and the like. Such physical or physiological data may include, for example: weather condition data (temperature, pressure, precipitation, wind speed, wind direction, etc.); athlete speed data; time of day data; altitude data; split time data between landmarks or benchmarks; heart or pulse rate data; body temperature data; blood pressure data; etc. After a route is recognized (e.g., based on GPS data, user input data, etc.), systems and methods according to examples of the invention may allow a user to easily process, sort, and/or display any desired information relating to that particular route, such as the best time on that route, fastest time to a landmark, fastest split time, etc.

Such data may be stored in any suitable or desired form or format, e.g., as a part of a conventional spreadsheet or other searchable and/or sortable form or format. Using at least some examples of such systems and methods, users may take a collection of performances stored on a personal computer (or on the portable device, if desired) and perform desired sorts, such as:

Fastest "lake runs" over 80 degrees outside temperature
Fastest "lake runs" before 9 am
Average "lake run" times when the average heart rate was over 150 during the first half
Fastest "lake run" when the time to run up "big hill in middle" was less than 10 minutes The availability of GPS data provides additional potential software/data processing capabilities relating to route information for systems and methods according to at least some examples of the invention. For example, based on GPS data and/or other data collected during the performance (e.g., data relating to route distance, altitude, elevation changes (e.g., hilliness), maximum elevation gains or changes, outdoor temperature, humidity, etc.), systems and methods according to at least some examples of the invention may assign a route "difficulty rating" to new routes, e.g., as they are recognized as described above. Optionally, if desired, systems and methods according to examples of the invention may rank the difficulty of new routes, at least in part, based on or taking into account the difficulty (or the data) associated with existing routes in the athlete's log, a predetermined standard, the athlete's physiological data (e.g., heart or pulse rate) associated with this route as compared to other routes, a user's subjective input, and/or any other suitable or desired basis. If desired, systems and methods according to the invention could determine and display one or more "difficulty ratings" for the various routes and/or for specific performances on the routes, and optionally rank the difficulty of each aspect (e.g., on a 1-10 scale, with 10 being most difficult). Example rankings for a particular route might include: flatness=1; length=8; altitude=4; etc.

The stored route data also may be used by athletes, their coaches, and/or trainers in various ways before an athletic performance takes place. For example, systems and methods according to at least some examples of the invention may provide "route playlists" for the athlete prior to beginning a workout or training routine. Such systems and methods further may allow user input regarding a desired workout or difficulty level and then ascertain a route from the stored universe of routes previously input by the athlete (or others). For example, based on user input requesting a specific difficulty level or some other parameter (e.g., input including approximate route length, route location, route elevation changes (hilly, flat, etc.), etc.), systems and methods according to examples of the invention could recommend routes that match or most closely match the user's requested input. As even more specific examples, a user may input data requesting, for example: a low difficulty 7 mile route, a flat 10 mile route, a 5 mile close to downtown, a hilly run in Seattle, etc.).

The universe or library of routes on a route "playlist" need not be limited to routes previously covered by a single athlete. For example, in at least some systems and methods according to the invention, data from routes used by a plurality of users may be combined in the available universe of routes, and systems and methods may select one or more potential routes for a user based on the user's requested input from this larger available universe of routes. As an example, a computer network, such as the Internet or the World Wide Web may be used to store a large universe of potential routes input from a plurality of users. Such systems and methods may be used, for example, to suggest new routes to users, such as routes for use during travel, etc. If desired, systems and methods according to at least some examples of the invention may provide maps, directions, and/or other more detailed route information to the user, e.g., before the performance and/or in real time as the individual is covering the route (e.g., on the portable display device). As an additional example, systems and methods according to the invention may devise routes that meet a user's input requests based on map data or information as opposed to selecting routes only from previous performances.

Additionally, systems and methods according to the invention may be used to compare input data associated with an individual athlete and from this data ascertain the athlete's "preferences." For example, systems and methods according to examples of the invention may determine that an individual likes to run about 6 miles during the week, that he/she but takes longer runs (e.g., about 10 miles) on weekends. Systems and methods also may determine typical altitude changes associated with an individual athlete's typical workouts (e.g., hilly vs. flat). As still another example, from map or GPS data, systems and methods according to at least some examples may determine other characteristics about the terrain associated with a typical workout (e.g., around water, in a park, through a woods, etc.). From this "preference" data or information, systems and methods according to at least some examples of the invention also may suggest new (or previously used) routes to an athlete, e.g., from a "playlist" or universe of routes at or near the athlete's location. Such information may conveniently be used during travel to locate a route having an athlete's preferred and/or familiar characteristics.

As another example, from input data relating to an individual's past performances, systems and methods according to at least some examples of the invention may automatically make recommendations for routes, other workout programs, or characteristics of a workout program for an individual. For example, systems and methods according to some examples of the invention may note that an individual has had several hard workout days in a row (e.g., based on total miles, heart rate measurements, altitude data, etc.). From that data, an appropriate future workout plan may be suggested by the system (e.g., including routes, desired activities, target times, etc.). Any desired algorithm may be used in determining when a system and/or method according to the invention may be triggered to suggest a new or different route or workout plan. Such systems and methods may be useful as tools to help prevent injury and/or overtraining 4. Multi-Media Aspects Using Sensor Input Additional aspects available in at least some examples of systems and methods according to the invention involve media playback devices that use input provided from one or more of a GPS monitor, physical monitor(s), and/or physiological monitor(s) to, at least in part, determine the content of printed, audio, and/or video output provided to the user during an athletic performance. Any type of printed, audio, and/or video display device may be used in this aspect of the invention, such as MP3 players, video devices, audio devices, cell phones, PDAs, beepers, pagers, and the like. In at least some examples of the invention, this printed, audio, and/or video display device will form the portable/wearable display 110 described above in conjunction with FIG. 1.

As one more specific example, systems and methods according to at least some examples of the invention may use output from one or more of the sensors (such as an accelerometer, GPS monitor, altimeter, barometer, etc.) to change media playback speed in proportion to athlete performance data, such as athlete movement speed. For example, the song beat may be selected or adjusted to synchronize with the user's movement speed (e.g., the song beat may be selected or adjusted to match the user's step beat). In some instances, the beat of the song may be sped up or slowed down, as necessary, to match (or substantially match) the user's step beat. In other examples, systems and methods according to examples of the invention may select a song from a playlist having a beat that matches (or substantially matches) the user's step beat. Any desired way of synchronizing the song and step beats and/or otherwise selecting a song having the desired beat may be used without departing from the invention.

As another example, using map data, historical altitude information, barometric information, or GPS information, an audio or video player associated with systems and methods according to the invention may be programmed or receive input to produce a "motivational" song or video clip when a hill or other difficult portion of the route is encountered. As still additional examples, songs or video clips (or other audio/video output) may be selected from a playlist based on one or more factors associated with the athletic performance, such as time or distance out on the route, the type of terrain encountered, elevation or altitude, and the like. In some example systems and methods, a user may categorize certain songs (or other audio/video data) within a playlist or a library as "uphill songs," "fast pace songs," "easy slow pace songs," and so forth, and then when the athletic performance is taking place, the system and method may select appropriate songs (or other audio/video data) from the categorized playlist based on real time sensor input.

Another example aspect of the invention relates to use of systems and methods to provide audio and/or video playback based on location along a route. Such systems and methods may use GPS location coordinates (or other location data) to select an audio and/or video selection based on proximity to a specific location. In at least some examples of such systems and methods, users may program, in advance, specific songs or playlists associated with a specific location. For example, assume an athlete runs a specific route three times a week. The athlete could program an audio and/or video device associated with systems and methods according to the invention (e.g., systems equipped with GPS) to play specific songs and/or video clips from a specific playlist every time he or she gets to a specific location, e.g., every time he or she gets to the north end of the lake, to a specific intersection, in front of a specific building, to the top of a stairway, or the like. As still another example, systems and methods according to at least some examples of the invention may provide historical, tourist, or other interesting information to the user along the route, e.g., depending on the location along the route. Such systems may be particularly interesting and useful to users while traveling.

Any suitable or desired sensor outputs and/or user actions may be relied upon to control or modify audio and/or video output, e.g., to trigger songs or video clips from playlists, without departing from aspects of the invention. For example, systems and methods according to at least some examples of the invention may be programmed to play slow or relaxing songs or video displays under certain conditions, e.g., if the athlete's heart rate or pulse rate exceeds 150 beats per minute, to cue the athlete to relax or reduce speed. As another example, if proximity to the end of a route or race is determined (e.g., using GPS, odometer, or pedometer information), an up-tempo song and/or video clip may be provided to cue the athlete to strive for a finish strong. As still another example, time into the athletic performance may be used to trigger selected audio and/or video output. For example, if an athlete has been running for more than two hours, systems and methods according to aspects of the invention may be programmed to select one or more songs (or other data) for playback from a "motivational" playlist that the athlete selected or purchased in advance (or, optionally, from a playlist maintained by the system or method without user input).

The audio and/or video output is not limited to commercially or publicly available songs, video clips, and the like. Rather, systems and methods according to the invention can play back or display any desired audio, video, and/or printed information without departing from the invention. For example, systems and methods according to the invention may be provided with a series of pre-recorded messages or other feedback responses that they provide based on sensor output and triggers. Optionally, the audio and/or video data may be user recorded and/or downloaded to the systems or methods from other sources. Example messages might include: "water station ahead;" "end of race 1 mile ahead," "nearing a first aid station," a message from a coach or trainer, and the like. A GPS sensor could trigger these messages at appropriate times (and optionally, if desired, provide map or direction information to help the athlete find the noted landmark or benchmark location). In one implementation, messages of this type may be recorded in MP3 format and played like any other song according to sensor triggers as described above.

Various other information and feedback may be provided in accordance with examples of the invention. For example, systems and methods in accordance with some examples of the invention may provide audio, visual, beeping, or other information when a physical or physiological condition (such as heart rate) falls above or below a preselected parameter or range. As still another example, safety or other information may be provided, e.g., to advise the user of approaching curves; terrain changes; excessive speed for approaching terrain, slope, or other conditions (e.g., if a biker approaches a curve too quickly); bicycle gearing information (e.g., suggested gears for speed, slope, or other approaching conditions; to meet goals; etc.); and the like. If necessary for sensing a desired parameter, the user's body, the bicycle, or other equipment may be equipped with appropriate sensors to provide the desired physical and/or physiological data.

The feedback provided to users is not limited to audio, video, or printed information. For example, if desired, vibrational or other tactile feedback may be provided to the user, e.g., through vibration or other elements provided in the measuring device, in footwear, in clothing, or the like. Such vibrational or other feedback devices may be programmed to provide output to the user whenever desired, such as whenever certain physical or physiological conditions exist or are measured.

Another option available in accordance with at least some example systems and methods according to the invention involves the use of wireless, "hands free," or other non-contacting controls of the system (such as the audio, video, and/or other display or feedback devices). For example, a hand or arm mounted accelerometer (e.g., on a bracelet, ring, or the like) may be used to activate, control volume, change channels or stations, or otherwise change the operational mode of an audio or video display device carried by the athlete during athletic performances. By waving a hand or arm (or through some other appropriate action), output from an arm or hand mounted accelerometer (or other movement sensing or similar device) may be used to activate and/or control audio, video, or other display or feedback devices. Eliminating the need for "hands on" control (e.g., to activate, change volume, change channels, change modes, etc.) can be useful to athletes during athletic performances to avoid diverting their attention and concentration from the performance and to avoid the need to locate and manipulate small controls typically associated with small electronic devices. As another example, if desired, voice or other audio commands may be used to control audio, video, or other display or feedback devices in a "hands free" manner.

5. Example Data Processing, Display, and Visualization

Additional aspects of the invention relate to post-performance analysis and processing including analysis and processing of performance data collected during an athletic performance. Additionally, aspects of the invention relate to the display and/or visualization used in at least some example aspects of systems and methods according to the invention. While any type of sensor data and/or combinations of sensor data may be provided on visual displays without departing from the invention, and while the input data may be analyzed and processed in any desired way without departing from the invention, various specific examples of processing and data displays are described in more detail below. Those skilled in the art will appreciate that these more specific descriptions are merely examples of suitable processing, analysis, and displays useful in accordance with the invention. Moreover, those skilled in the art will appreciate that all of the displays described below may be provided as part of any suitable or desired display arrangement or system, including displays on portable and non-portable devices, such as display devices for personal computers, cell phones, PDAs, music or video players, bike mounted displays, and the like.

a. Two-Dimensional Graphic Displays

Figure 2:
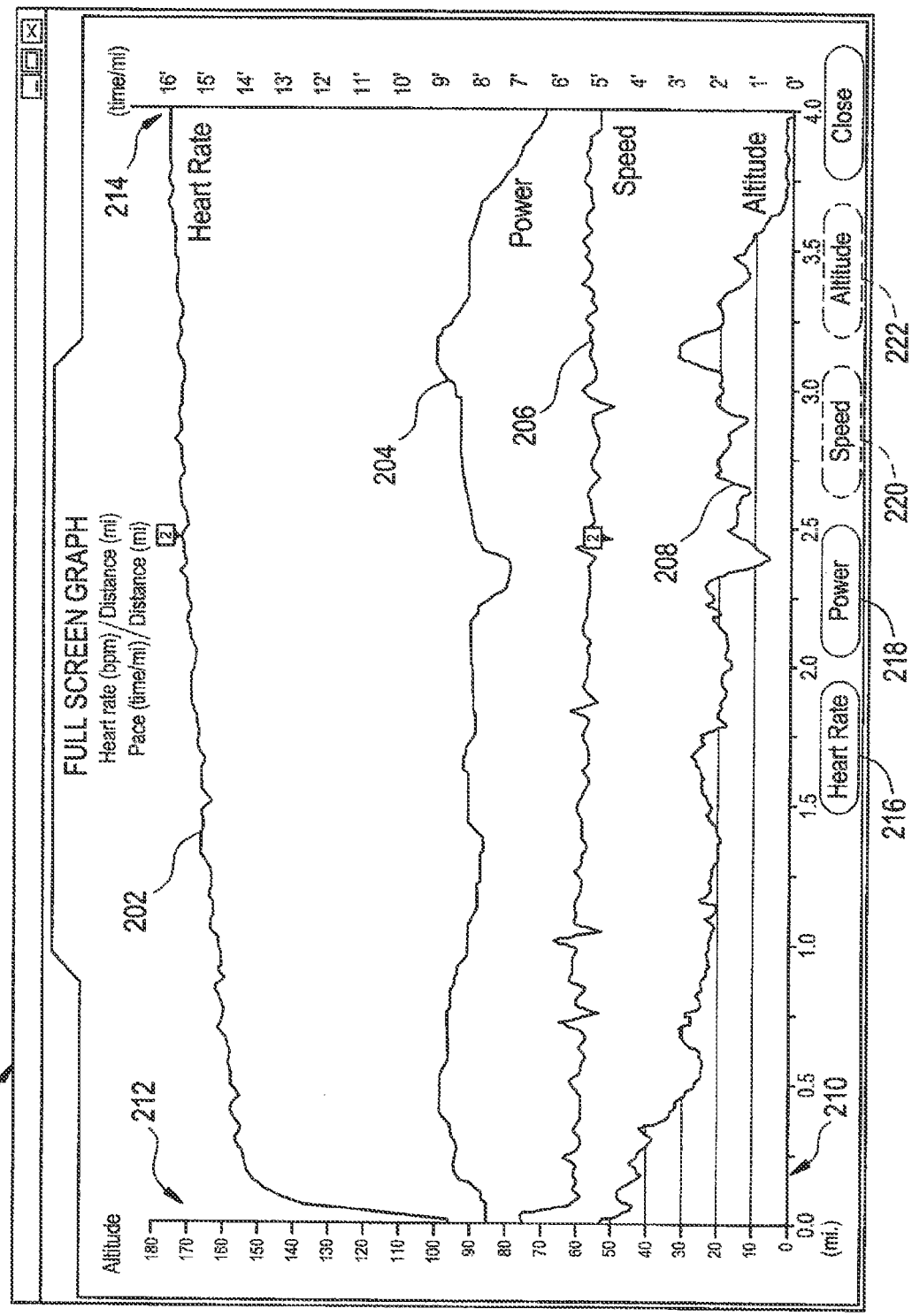
FIG. 2 illustrates an example two-dimensional graphical display that may be used in displaying athletic performance data collected by systems and methods according to examples of the invention.

FIG. 2 illustrates an example display or screenshot 200 that may provide data and information to athletes, their coaches, and/or their trainers in accordance with at least some examples of this invention. This screenshot 200 may be provided as part of any suitable display arrangement or system, such as from a personal computer, a cell phone display, a PDA device, a music or video player, a bike mounted display, or any other portable or desired device.

The physical and/or physiological sensors required to produce the graphs in the display 200 illustrated in FIG. 2 include: (a) a distance, clock, and/or timing sensor; (b) a heart rate monitor (for the heart rate v. distance data); (c) a speed and/or distance measuring device (e.g., accelerometer or pedometer based or GPS based); and (d) a source of altitude information (e.g., GPS based, barometric pressure sensor based, topographic map data based, etc.). As some more specific examples, the system may include only a GPS monitor and a heart rate monitor, or it may include a combination of a heart rate monitor, an accelerometer-based or other pedometer-based speed and distance monitor, and a barometric pressure altitude sensor.

Any number of screens or displays may be generated to provide the desired data and information to users without departing from the invention. Optionally, in at least some examples, including the example shown in FIG. 2, a single screen will provide data and information relating to a variety of parameters. For example, the screenshot 200 of FIG. 2 simultaneously displays: (a) heart rate v. distance (or time) data (curve 202); (b) power v. distance (or time) data (curve 204); (c) speed v. distance (or time) data (curve 206); and (d) altitude v. distance (or time) data (curve 208). In the illustrated example, distance (or time) is charted along one of the coordinate axes (e.g., in miles along the horizontal axis 210), and one or more of the other desired parameters may be charted along other coordinate axes.

Optionally, individual displays of any of the desired data collections or parameters may be activated and/or inactivated in any suitable manner. For example, at the time specifically illustrated in FIG. 2, the left vertical coordinate axis 212 is charted for altitude data and the right vertical coordinate axis 214 is charted for speed data (e.g., in minutes/mile, miles per hour, kilometers per hour, etc.). The displayed data may be changed in any desired manner, for example, by activating one of the presently non-activated software radio buttons 216 or 218, to actively display the coordinate axes for heart rate or power, respectively (radio buttons 220 and 222 for speed and altitude, respectively, are shown in broken lines in FIG. 2 to indicate that the Y-coordinate axes corresponding to these buttons are being actively displayed).

As another potential option, axes and/or coordinate labels for all of the parameters (e.g., heart rate, power, speed, and altitude in this example) may be displayed simultaneously at all times, rather than using a switchable display, without departing from the invention. As still another example, a drop down menu, tool bar item or menu, right mouse button clicks, or the like, may be used to enable switching between different displayed data sets and/or coordinate axes without departing from the invention. Any manner of switching the display 200 to provide the other potential data, axes, or parameters may be used without departing from the invention.

b. Two-Dimensional Display with Map Data

Figure 3:
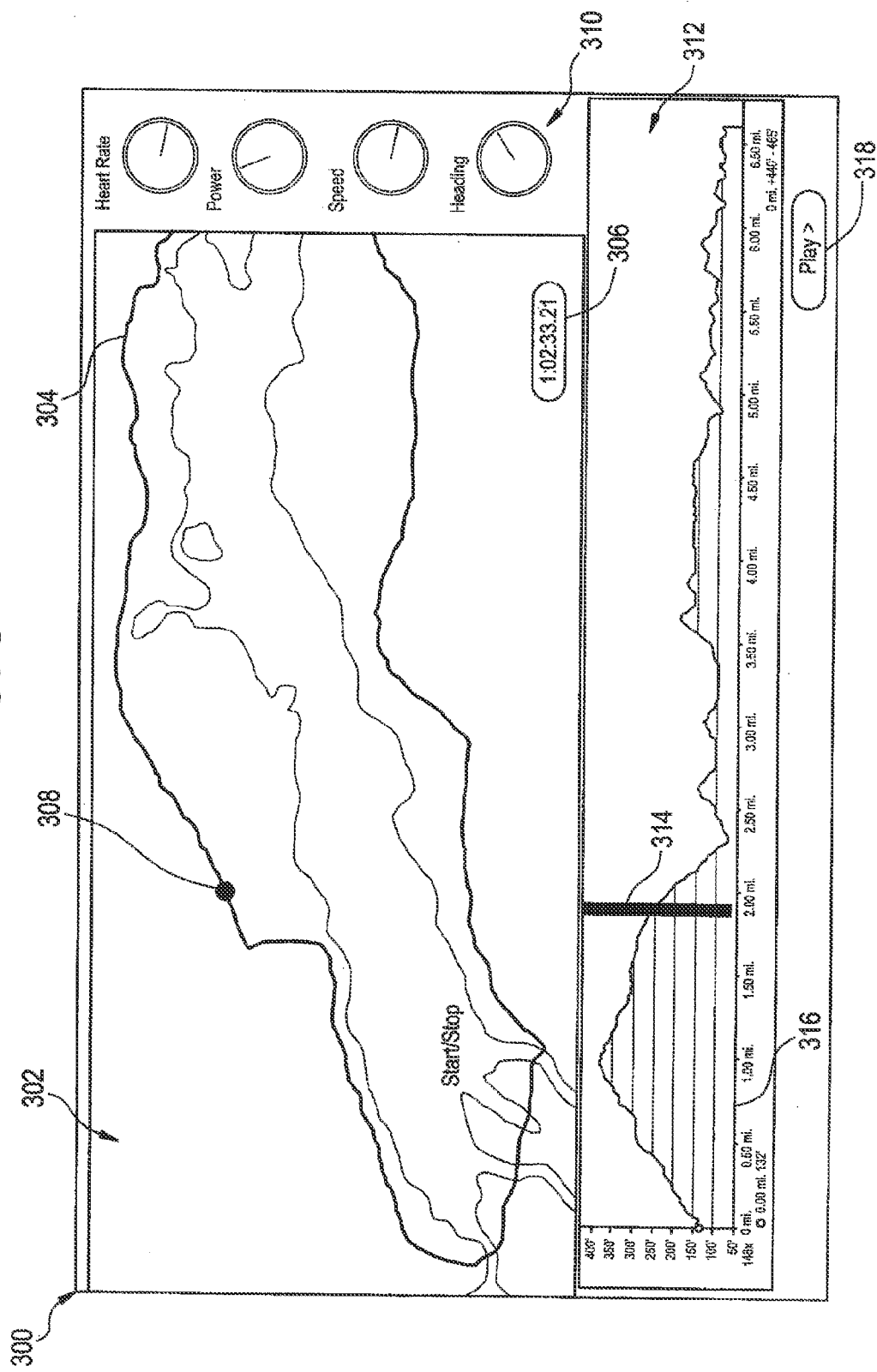
FIG. 3 illustrates an example display including map data and two-dimensional graphical data that may be used in displaying athletic performance data collected by systems and methods according to examples of the invention.

FIG. 3 illustrates another example of processing and/or display of athletic performance data in systems and methods according to at least some examples of the invention. In this example, the screenshot or display 300 provides at least some of the data relating to the athletic performance superimposed over (or otherwise provided on) two dimensional map data corresponding to the location at which the athletic performance took place. Of course, data relating to multiple athletic performances may be simultaneously displayed or otherwise made available in the display of screenshot 300 without departing from the invention. The general underlying map data of this type is known and publicly available to those skilled in the art.

For the display 300 illustrated in FIG. 3, the sensors or monitors used to produce the display 300 include: (a) a distance, clock, and/or timing sensor; (b) a heart rate monitor (for the heart rate data); (c) a speed and/or distance measuring device (e.g., accelerometer or pedometer based or GPS based); (d) a source of altitude information (e.g., GPS based, barometric pressure sensor based, topographic map data based, etc.); and (e) a source of directional information (e.g., compass, GPS, etc.). Any combination of monitors or devices may be used to provide the data without departing from the invention.

This example display 300 includes at least three general regions of interest. First, the map display region 302 displays the route 304 covered during the athletic performance superimposed (or otherwise provided on) a conventional map. This display region 302 (or other area on the display 300) further may include a clock or timer 306 that displays any desired time information, such as the actual current time, the time of day corresponding to the time when the athlete was at the location of the cursor or icon 308 on the map, the elapsed time into the athletic performance, etc. Of course, other information may be included in the map display region 302, if desired, without departing from the invention, such as map scale data, multiple timers 306, multiple icons (representing multiple performances), multiple routes, etc.

The display 300 further includes performance data display region 310. This region 310 includes "gauge-type" displays that simultaneously display data relating to various physiological and/or physical parameters associated with the athletic performance. For example, display region 310 displays "gauges" corresponding to the athlete's measured heart rate, power output, speed, and direction (or "heading"). While not illustrated in FIG. 3, the gauges provided in display region 310 may include numerical markings (or other suitable markings) to provide measured data information to the user. Of course, any desired way of displaying the performance data may be used without departing from the invention. As another example, one or more scales, numerical displays, or digital gauges (e.g., displays or gauges that include the measured data) may appear in display region 310, wherein the data displayed by the display, gauges, or the like correspond to data collected at a location of the computer's cursor or input device within the display region 302. As still another example, full time digital displays or digital gauges may be provided rather than the analog gauge displays illustrated in FIG. 3. Any desired way of displaying the performance measured physiological and/or physical data may be used without departing from the invention.

In at least some instances and/or in some modes of operation, the data displayed via the gauges of display region 310 will correspond to the data as measured at the location of icon 308 in the map display region 302. If no data is available for the location exactly corresponding to the icon 308 location, systems and methods according to examples of the invention may handle this situation in any suitable or desired manner without departing from the invention. For example, the specific gauge or gauges in gauge display region 310 may be left blank or display no data, they may display the available data from the closest available location, they may display data from the closest available location provided that this location is within a predetermined time or distance of the icon 308 location, etc. Of course, if desired, the various gauges or displays may be selectively turned on or off by the user, e.g., using radio buttons, toolbar menus, drop down menus, right clicks, etc. Also, a user may be given choices into which parameters are to be displayed in region 310, if desired.

Display 300 further includes a two-dimensional graph region 312 that displays data associated with the athletic performance against distance (or time) during the performance. While any measured parameter or set of parameters may be displayed in region 312, the illustrated example shows altitude displayed as a function of distance along the route. Optionally, systems and methods according to at least some examples of the invention may allow switching between various different and available parameters, e.g., periodically over time, based on a predetermined algorithm, based on user input, based on instantaneous user selection, etc.). The location of the icon 308 in the map display region 302 is marked in the two-dimensional graph region 312 using bar icon 314, although any desired marking (or no marking at all) may be used without departing from the invention. As another example, the horizontal scale 316 of two-dimensional display region 312 may match the scale and location of map region 302 such that the data as you move horizontally across two-dimensional display region 312 matches the X coordinate location in the map region 302 (because the route 304 overlaps in the X coordinate direction (e.g., it is a round trip in this example), the two-dimensional region 312 may provide access to the appropriate data corresponding to each time that the athlete crossed the particular X-coordinate point on the map data without departing from the invention e.g., via different graphs, via different colors, via different display regions 312, etc.).

As another example feature, systems and methods according to at least some examples of the invention allow users to manually place the icon 308 at any position along the route 304, and the system will automatically display data relating to that position, such as: (a) the time along the route 304 (e.g., at clock 306); (b) the distance along the route 304 (e.g., using bar icon 314 and horizontal scale 316); (c) physical and/or physiological data associated with that location (e.g., in regions 310 and/or 312); etc. In such examples, when the cursor or icon 308 is placed at a specific location along the route 304, the various data displays (e.g., the time, distance, physical, and/or physiological data noted above) can quickly "snap" to the corresponding data for that location. As another example, simply moving the mouse cursor or other input device over a portion of the route 304 (e.g., without clicking the mouse button to move the icon 308) may, at least temporarily, cause data for that location to be displayed.

As still another example feature, data relating to the athletic performance (e.g., the time, distance, physical, and/or physiological data noted above) may be displayed and changed to correspond to the various positions along the map route 304 as the icon 308 automatically moves and follows the route 304, e.g., in animation. For example, activating the "play" button 318 may be used to cause the icon 308 to move along the route 304 (e.g., in real time, in an accelerated manner, in a slowed manner, in a combination of different manners, etc.), while the data actually measured during the performance is displayed and changes along with the changing position of the icon 308. In effect, the icon 308 on the map region 302 becomes a "virtual runner." Additionally, the icon bar 314 in the two-dimensional display region 312 may be used to show the virtual runner's progress on this display region 312 (e.g., by moving the icon bar 314 along the altitude graph in the illustrated example).

Of course, those skilled in the art will understand that many variations and changes may be made to the specific information displayed, the form or format of its display, and the like, without departing from the invention.

c. Three-Dimensional Display with Route and Other Performance Data

Figure 4:
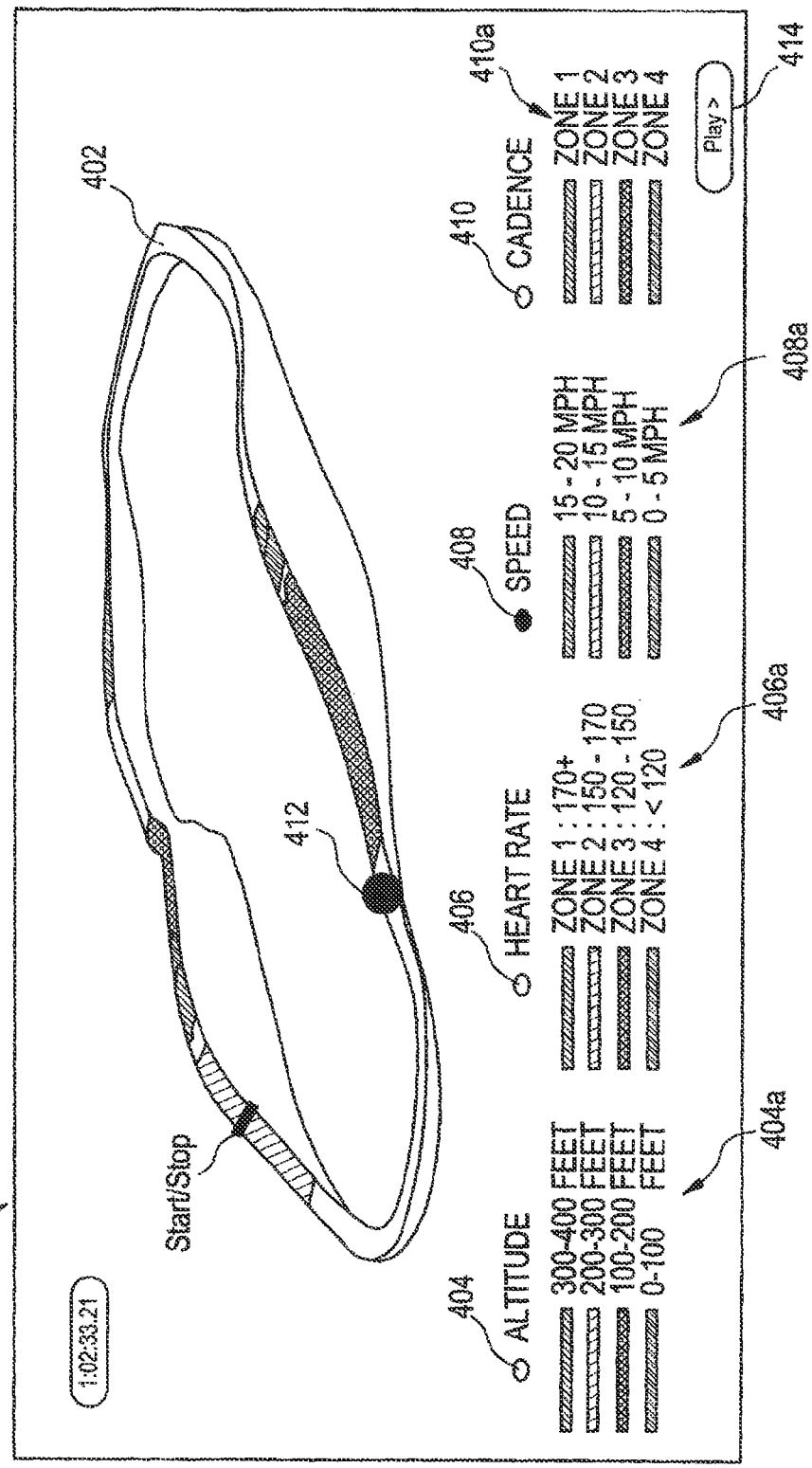
FIG. 4 illustrates an example three-dimensional display including topographical information that may be used in displaying athletic performance data collected by systems and methods according to examples of the invention.

FIG. 4 illustrates another example of processing and/or display of athletic performance data in systems and methods according to at least some examples of the invention. In this example, the screenshot or display 400 provides a graphical representation of the route 402 with at least relative altitude information provided via a three-dimensional topographical display of the route 402, which at least generally shows elevation changes along the route 402. To provide the raw data for building a display like display 400 shown in FIG. 4, the athletic performance monitoring system monitors and/or provides periodic (and frequent) data regarding the athlete's absolute position and altitude versus time (or distance), e.g., via a GPS monitor or other appropriate systems. In at least some examples, a three-dimensional view of the route 402 as shown in display 400 of FIG. 4 may be "built" or determined by a computer system by taking the intersection of the route taken with topographical data corresponding to the location along the route 402 (e.g., from topographical map data, altitude sensors, GPS data, etc.).

Three-dimensional route displays 400, like that illustrated in FIG. 4, are not limited to simply providing general route and topographical data. Rather, additional information relating to the athletic performance may be incorporated into the topographical or three-dimensional route 402. Any of the measured athletic performance data may be included in the display 400 without departing from the invention, such as the measured time, distance, physical, and/or physiological data described above. As one more specific example, the three-dimensional route 402 may be color coded, hatched, or otherwise marked in the display 400 to illustrate the changes in the measured parameters over the route 402 during an athletic performance. FIG. 4 shows four available measured parameters associated with the athletic performance represented by the route 402 on the display 400. Specifically, software radio buttons 404, 406, 408, and 410 are provided to allow the user to switch the displayed color coded data on the route 402 between the various measured parameters available for display (e.g., to switch between altitude, heart rate, speed, and cadence in the illustrated example). By selecting different data sets (by activating one of the radio buttons 404, 406, 408, or 410), the color (or another characteristic) of the route 402 will change to correspond to the measured parameter relating to the athletic performance or other data (if any is available) at that location. For example, if a user were to click the heart rate radio button 406, the top surface of the route 402 will change colors (or other characteristics), based on the key 406*a*, to indicate the athlete's measured heart rate at that specific location. For example, the surface of route 402 may be yellow when the athlete's heart rate exceeded 170 beats per minute ("bpm") during the athletic performance, red when in the 150-170 bpm range, green in the 120-150 bpm range, and blue when below 120 bpm, and these standards may be provided to the user in key 406*a* (other keys 404*a*, 408*a*, and 410*a* are provided for the other displayable parameters). User selection of another radio button 404, 408, or 410 will automatically change the route color, where necessary, to correspond to the data for that measured parameter.

If desired, an icon 412 may be provided along the route 402, and data relating to the athletic performance, e.g., the measured time, distance, physical, and/or physiological data, may be played back in an "animated" manner as described above in conjunction with FIG. 3 (e.g., by activating the "play" button 414, etc.).

Those skilled in the art will recognize, of course, that many variations in this type of display 400 are possible without departing from the invention. For example, other ways of switching between displays of the different parameters may be used without departing from the invention, such as through the use of drop down menus, other menus, tool bar items, right mouse button clicks, and the like. As another optional example, if desired, more than one parameter may be displayed at a time on the route 402 (e.g., by color coding plural vertical layers along the route, providing additional analog or digital gauges, etc.). As still another example, the display 400 may be set up to periodically and/or automatically switch the parameter(s) being display. Many other display alternatives or options are available without departing from the invention.

d. Topographical Map Display with Route and Other Performance Data

Figure 5:
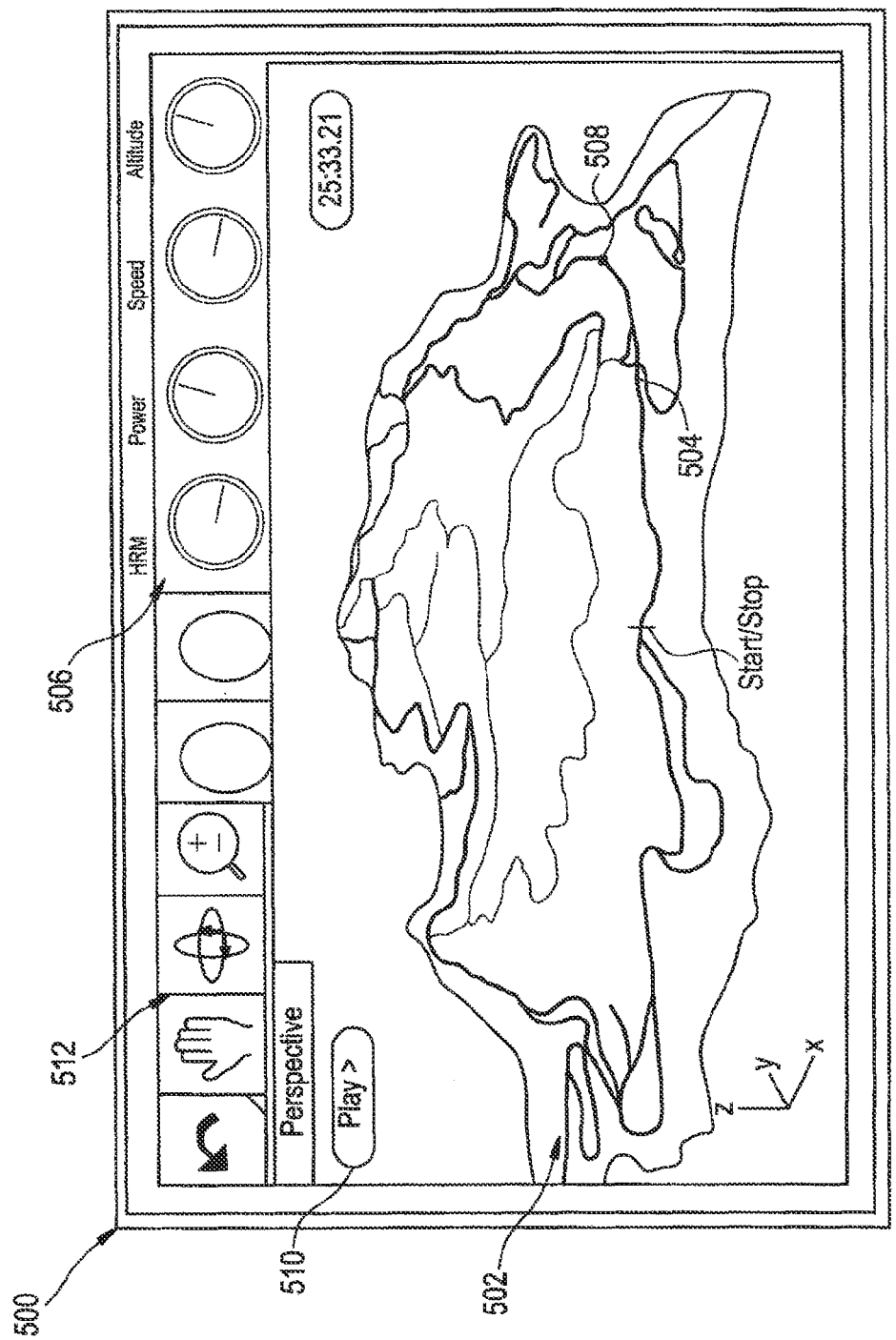
FIG. 5 illustrates an example three-dimensional display including topographical map data and information that may be used in displaying athletic performance data collected by systems and methods according to examples of the invention.

FIG. 5 illustrates another example of processing and/or display of athletic performance data in systems and methods according to at least some examples of the invention. This example, in at least some respects, comprises a conceptual combination of the displays illustrated in FIGS. 3 and 4 to provide a three dimensional elevational model or representation of the athlete's route. More specifically, the screenshot or display 500 in FIG. 5 provides a three-dimensional or topographical map 502 as a background, and the route 504 used during the athletic performance (or during multiple performances) is superimposed on (or otherwise provided on) the map data from data collected during the athletic performance (e.g., from GPS collected data).

The display 500 further includes performance data display region 506. This region 506, like region 310 described above in conjunction with FIG. 3, may include "gauge-type" displays that simultaneously display various measured physiological and/or physical parameters associated with the athletic performance. For example, display region 506 displays "gauges" corresponding to the athlete's measured heart rate, power output, speed, and altitude. This display region 506 may take on a variety of different forms and formats and provide a variety of different information, e.g., like the forms, formats, and/or information provided in region 310 described above in conjunction with FIG. 3.

Also, as described above in conjunction with FIG. 3, the display region 506 of FIG. 5 may be used to display data associated with the athletic performance at the location of an icon 508 provided along the route 504. The location of the icon 508 along the route 504 may be changed in any desired manner without departing from the invention, and the data displayed, e.g., in display region 506, will correspond to the data measured at or near the location of the icon 508 along the route 504. As examples, in the manner described above in more detail in conjunction with FIG. 3, a user may selectively place the icon 508 at places along the route 504 (e.g., using a mouse or other input device), an "animation" procedure may be used to automatically move the icon 508 along the route 504 (e.g., by activating play button 510), etc.

The display 500 of FIG. 5 shows some additional features that may be included in systems and methods according to at least some examples of the invention (including any of the various displays, systems, and/or methods described above and below). Specifically, this example display 500 includes a tool bar region 512 that allows easy access to various functions associated with the display, system, and/or method. As examples, the tool bar region 512 may provide various features that correspond to tools provided with conventional map and/or three-dimensional computer-aided design ("CAD") application programs. As more specific examples, the displayed map form and format may be manipulated by the user by using scaling, zooming, spinning, and rotating tools through tool bar region 512. Such functions are conventionally available, e.g., in the map and CAD arts.

Of course, any desired data and/or information may be included in the display 500 without departing from the invention. In the illustrated example, the sensors and/or monitors required to produce the display 500 include: a heart rate monitor (for the heart rate v. time, distance, or location data); a position measuring device (e.g., GPS, accelerometer or other pedometer based system); and a source of altitude information (e.g., GPS, barometric pressure sensor, topographic map data, etc). As one more specific example that uses GPS data, upon download of the GPS route points for the athletic performance, the application software may be adapted to further download relevant topographical map data to cover the area of the route 504, optionally with a some additional data (e.g., a half mile surrounding the route 504 perimeter), from any suitable map data source, such as a CD, a hard disk, or the internet (or other network), including from conventional and/or commercial sources. Because the complete athletic performance is bounded by the measured GPS coordinates, systems and methods according to examples of the invention will be able to locate and/or download the relevant map area data.

The topographical map data then may be used to build a three dimensional model of the terrain. The route 504 taken over this terrain then is overlaid or superimposed on the map in a visible color. Additionally, if desired, as illustrated in conjunction with FIG. 4, multiple colors may be used on the surface of the route 504 to indicate various time, distance, physical, and/or physiological parameters associated with the locations along the route 504, such as specific speed zones, heart rate zones, intensity levels, power levels, and so forth.

Additional or alternative data may be included in the map representation 500, if desired, without departing from the invention. For example, information specific to a particular athletic event or performance also may be included on the map data from any desired source, such as additional map sources (e.g., texture maps), satellite photos, sport specific photography or images, etc. As a more specific example, for a long race or event (such as a marathon, bicycle race, triathlon, road rally, etc.), a race specific map may be used to provide at least some of the map region 502 such that data associated with the race or other event, e.g., aid stations, start/finish line, and/or other information, also is included in the route map region 502.

Of course, the display 500 of FIG. 5 (as well as the various other example displays described above and below) need not be limited to those available for use on a personal computer. Such displays may be provided at any suitable or desired location and/or as part of any suitable or desired device without departing from the invention, such as on a cell phone, a PDA, an audio or video player, a bike mounted display, other portable devices, and the like. If desired, the type of map data described above, including event specific map data, may be provided to the athlete prior to and/or during the athletic event, for use during the event (e.g., downloaded to the portable device used by the athlete, received via satellite or other connection during the event, etc.).

e. Event Playback

Figure 6:
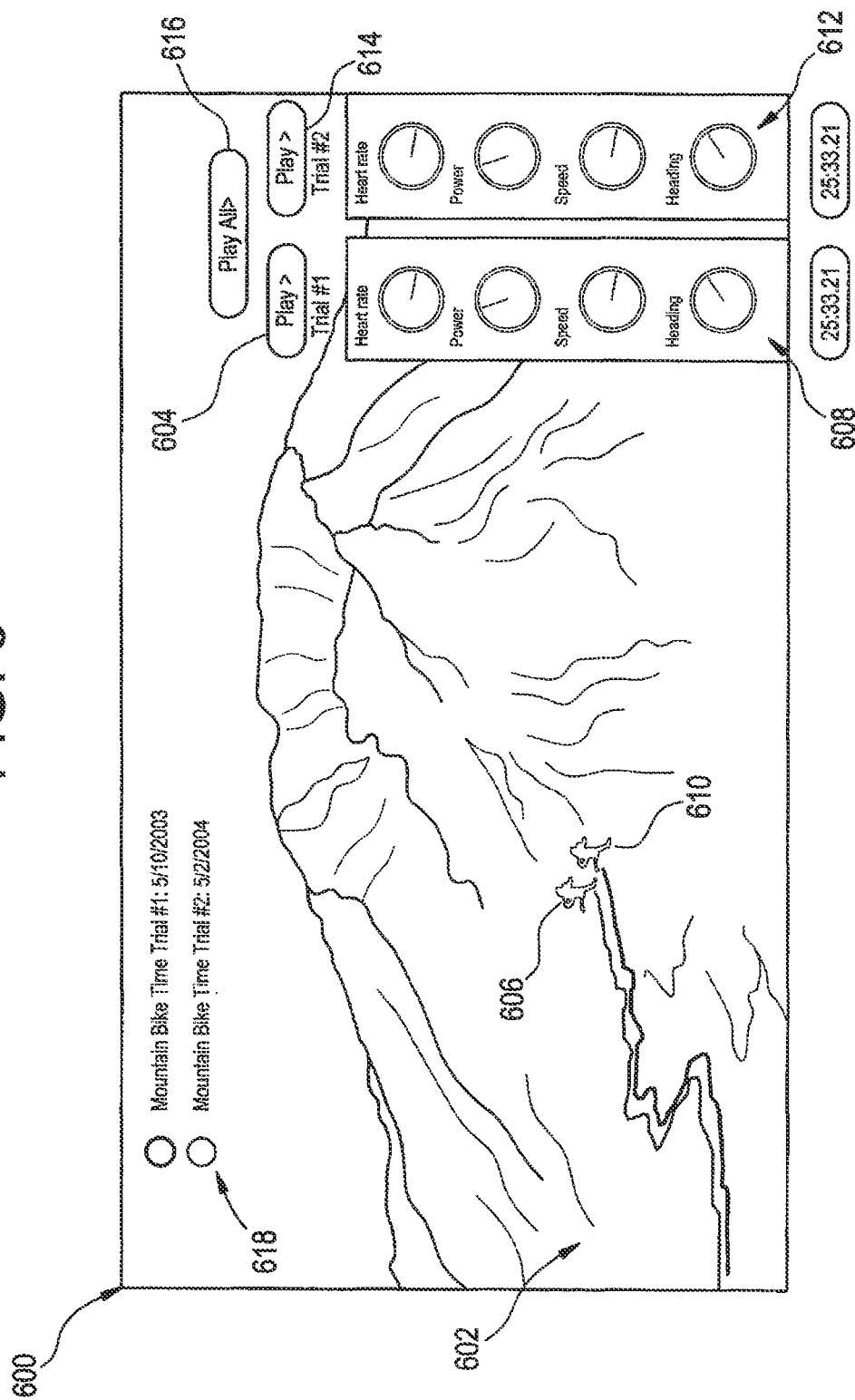
FIG. 6 illustrates an example three-dimensional display including topographical information that may be used in displaying athletic performance data collected by systems and methods according to examples of the invention, e.g., for displaying performance data in a "playback" format.

FIG. 6 illustrates another example of processing and/or display of athletic performance data in systems and methods according to at least some examples of the invention. This example system and method includes visualization of one or more previously recorded athletic performances on a display 600 with animated event "playback" characteristics. While any background may be provided without departing from the invention, such as map data, topographical map data, and the like, in the illustrated example the background 602 provides an animated view of the actual terrain involved in the performance. As examples, in the event playback mode, a user can select a playback speed, hit a "play" button 604, and then watch a "virtual" athlete 606 recreate the event on the background terrain or map 602. During the playback, there may be indicators 608 (e.g., like those shown in FIGS. 3 and 5 or other desired indicators) showing the instantaneous values of various measured time, distance, physical, and/or physiological parameters associated with the athletic performance at locations along the route traveled by the virtual athlete 606.

The illustrated display 600 shows two virtual athletes 606 and 610 on the same (or approximately the same) course or route. The second virtual athlete 610 may represent the same individual and correspond to data associated with two different performances on the same (or similarly located) route. As another alternative, the second virtual athlete 610 may represent a different individual from the first virtual athlete 606, and the two displayed events may represent the two athlete's head-to-head competition in a single event or their individual efforts on the same course staggered or otherwise at different times. A second indicator display region 612 also may be provided to display instantaneous values of various measured time, distance, physical, and/or physiological parameters associated with the second virtual athlete 610's athletic performance at locations along the route. Of course, the data for the two athletic performances may be obtained from any source(s) without departing from the invention. Additionally, users may independently animate the action from each virtual athlete 606 and 610 (e.g., by separately activating "play" buttons 604 and 614 in the illustrated example or taking other appropriate action), or the virtual athletes 606 and 610 may be activated simultaneously and virtually "race" one another (e.g., by activating the "play all" button 616 in the illustrated example, or taking other appropriate action).

In the specific example illustrated in FIG. 6, a key area 618 identifies the displayed performances. In the illustrated example, the key area 618 indicates that the display 600 includes data from an individual athlete that had completed the same route or course twice. In the illustrated example, the two athletic performances were about one year apart. Using systems and methods according to this example of the invention, both performances may be played back simultaneously (or side-by-side or consecutively (optionally in a stepped fashion)) on a single terrain map. In this manner, the user (e.g., the athlete, coach, and/or trainer) will be able to see the progress and physical parameters of each performance, side-by-side, as the virtual "race" or performances progress. Such comparative data may provide valuable information as to how an athlete's conditioning has changed over time and help determine what changes may be needed to help the athlete reach his/her goals. As another example, a user may use this display to compare his/her performance on the same course to another, such as a professional athlete, to gauge how well one might perform against the professional or other athlete.

Of course, if desired, more than two virtual athletes may be provided in an individual display 600 without departing from the invention. Also, any way of providing and/or displaying the time, distance, physical, and/or physiological data to the user may be provided without departing from the invention, including but not limited to the various specific examples discussed above in conjunction with FIGS. 2-5. Furthermore, if desired, the ability to simultaneously display data relating to two or more independent athletic performances may be applied to any of the various systems and methods described above.

Again, the display features and options described above need not be limited solely to post-performance analysis. In at least some example systems and methods according to the invention, a portable device that plays this type of animation (e.g., in real time) during an athletic performance may be useful to the athlete participating in the event. For example, a cyclist may work with a coach or trainer to plan a race strategy (pace, effort level, etc). Such a plan or strategy may be based on a past performance by the athlete (or another) over the same route. To use this information during the event, the cyclist may have a "PDA-type" device mounted on his handlebar, to shows him the terrain ahead, where he should be to meet his plan or goal, to compare him with an "ideal" or "model" performance, to compare with an elite athlete's performance, etc. Such a system and method also may show the athlete the location of one or more competitors, e.g., if the system and method are capable of receiving wireless data (e.g., a cell link, satellite link, etc.). In this manner, the athlete may use this device to monitor and access the overall race and/or his standing with respect to one or more of the other racers. Wireless links with devices of this type also could provide data (e.g., time, distance, location, physical parameters, physiological parameters, etc.) during the event to the athlete's coach or trainer, third parties (e.g., the media), etc.

f. "Fly-by" Animation

Additional aspects included in at least some example systems and methods according to the invention involve "fly-by" animation. Such systems and methods may utilize data displays of the type described above, such as displays including three-dimensional map or terrain data. In the example of the invention described above in conjunction with FIG. 6, an event or athletic performance was played back for the user, but in those systems and methods the user's point of view was fixed and stationary. The "fly-by" animations in accordance with the present aspects and examples of the invention allow users to move their viewpoint (e.g., the camera's eye view) to follow the playback of a performance in the manner that they choose.

In at least some examples, this concept involves the user's viewpoint following a virtual athlete on the computer display during the course of an athletic performance playback. The effect may be considered to be similar to following an athlete in a helicopter during an athletic performance. The user could pick viewpoint camera angles and the "height" above the terrain for the visualization. For example, users could simulate a 100 ft fly-by, a 500 ft fly-by, a 1000 ft fly-by, etc. If desired, in at least some systems and methods, the same fly-by simulations could be performed without virtual runners, e.g., to allow athletes, their coaches, and/or trainers to view the animated depiction of the course, for the purpose of devising a performance plan or strategy for the athlete.

Currently, "freeware" versions of "fly-by" software are known and available that allow one to perform a simulated flight over terrain. At least some examples of the invention additionally allow depiction of an athletic performance to be included in the fly-by, optionally additionally including timing, distance, physical, and/or physiological data relating to the performance. Moreover, the fly-by depiction may be timed to move so as to follow and/or track one (or more) of the virtual athletes. If desired, data corresponding to several different athletes or the same athlete at different times on the same course may be played back at the same time during the fly-by (e.g., as described above in conjunction with FIG. 6). For example, assume that five athletes competed in a long race having a staggered start (e.g., a marathon, a bicycle race, a ski race, etc.) with GPS equipped hardware, physical and/or physiological sensors, as described above. After the event (or between individual stages), data relating to their performance may be downloaded to a host computer with application software. A re-enactment of the race or stage then may be played back with all five athletes competing on the same virtual terrain/topographical map of the race course, at the same starting time, etc. The data may be played back at multiple speeds and viewed from multiple camera angles or fly-by viewpoints. Instantaneous heart rate data, speeds, and the like may be displayed on the screen for each athlete during the simulation for comparison purposes.

Additionally or alternatively, "fly-by" videos of sporting events (e.g., marathon courses, golf courses, cycling courses, triathlon courses, etc.) may be produced and made available to athletes or teams before the event. Users could use these "fly-by" videos and follow a virtual athlete through a topographical representation of the entire race. Water stations, hills, first aid stations, and so forth could be visualized on the topographical representation on the video. This information may be used to assist athletes, trainers, and/or their coaches in developing a plan or strategy for the event. Similarly, a portable device may be used to play back this information during the race, e.g., to inform the athlete of the approaching terrain, landmarks, and/or other information.

6. GPS-Assisted Pace Adjustment and Feedback

Additional aspects included in at least some systems and methods according to the invention relate to the use of GPS data prior to and/or during an athletic event or performance to assist in pace adjustment. Presently, athletes, their coaches, and/or their trainers may manually determine target split times for a race or route (e.g., times to a landmark, benchmark, specific distances, etc.), and these split times may be adjusted to account for the specific terrain on the route. For example, prior to running a marathon, one may have a predetermined target finishing time, and they then may develop a race plan that gives each mile split time, adjusted for uphill and/or downhill terrain variations, time during the race, etc. Typically, these split times will be printed on a bracelet worn on the athlete's wrist during the race.

Various aspects of the invention may improve on this known technique. For example, after running (or otherwise covering) any route with a GPS monitor in an athletic performance monitoring system and method according to examples of this invention (or otherwise obtaining data relating to the route, e.g., from different data sources, different sensors, etc.), an athlete, trainer, or coach may use that data in conjunction with a computer (or other processing device) to automatically generate their own virtual version of the route and/or use this data to develop an adjusted race plan for the route. For example, after providing the necessary route data for the system and method (e.g., by running or otherwise moving over the course with the GPS monitor system and/or other portions of an athletic performance monitoring system according to the invention), the tracking points may be downloaded to a computer. Then, upon supplying a target completion time for the same route, the software would provide route adjusted split times for each mile and/or other segment distances, optionally taking into account the elevational changes over the route, prevailing wind directions, wind speed, and/or other factors that may influence the difficulty of one portion of the course versus another. Such systems and methods also could calculate target split times to reach specific course landmarks, like aid stations, the halfway point, the bridge, and so forth. Optionally, such systems and methods may be operated shortly before the race begins, to enable incorporation of the local conditions at the time of the race (e.g., wind speed, direction, etc.). Any desired algorithm may be used to determine appropriate split times from a target overall time without departing from the invention.

In at least some examples of systems and methods according to the invention, updated split times may be provided to an athlete during the event, e.g., based on the past performance during the event. These updated split times may be adjusted, based on the past performance, to still enable the athlete to meet his/her preset timing goals, assuming that all succeeding split time goals are met.

The split time information (and/or optionally any other desired information relating to the route, etc.) may be downloaded to a portable device carried by or with the athlete during the event, such as a watch, beeper, PDA, music or video player, or the like. This portable device may be populated with the split time and/or other data via any desired means or in any desired manner, such as a radio link, wireless data link, wired data link, cell phone link, satellite link, etc. While this aspect of the invention may be utilized in combination with receipt of GPS data, receipt of GPS data is not a requirement for all examples of this aspect of the invention. For example, one could download target lap times or split times from the Internet or another data source to the portable device for popular events (e.g., marathons or other races) without use of GPS data.

Many variations on these examples and aspects of the invention are possible without departing from the invention.

7. A Running "Power" Parameter

An additional aspect of this invention relates to determination, use, and display of a "power" parameter associated with running. In cycling and various other forms of exercise, there are devices available capable of measuring the amount of power expended versus time for the athlete. In cycling, this parameter corresponds to or relates to the power that the cyclist expends to overcome bicycle tire rolling resistance, wind resistance, moving mass over altitude, change in inertia for rotating and non-rotating components, and so forth. It is relatively easy to measure this parameter for a cyclist, because there are several convenient ways to tap information regarding the power expended by the cyclist, e.g., at the pedal, in the crank, or with the chain. There is no equivalent "power" measurement parameter for running because of the difficulty in accurately measuring power transferred in the shoe.

Systems and methods according to at least some examples of the invention may use a new derivation or estimate of running "power," e.g., using speed and altitude change data generated from GPS, pressure sensors, and/or other sensors carried by the athlete during the event (e.g., integrating an accelerometer data, etc.). For example, knowing the above data, and due to the fact that one can closely approximate drag (e.g., from speed, weight, size, wind speed and/or direction (optionally neglecting the wind effects)) and inertia (due to speed change and mass), a running "power" parameter may be determined. This new power parameter may be used as a useful training metric, much the way that heart rate is, as indicating a measure of athletic output during a performance. The running power may be displayed on the wrist or other portable display, on the personal computer pre- or post-exercise, and/or on any other desired device.

8. Example Hardware

As will be appreciated by those skilled in the art, aspects of this invention may be practiced using electronic circuitry, such as solid state circuitry. Various examples and aspects of the invention, however, may be implemented using computer-executable instructions, such as software program modules, executed by programmable computing devices. Because these examples and aspects of the invention may be implemented using software, the components and operation of a typical programmable computer system on which such examples and aspects of the invention may be employed will be described. More particularly, the components and operation of a programmable computer will be described with reference to FIG. 7. This operating environment is only one example of a suitable operating environment, however, and it is not intended to suggest any limitation as to the scope of use or functionality of the invention.

Figure 7:
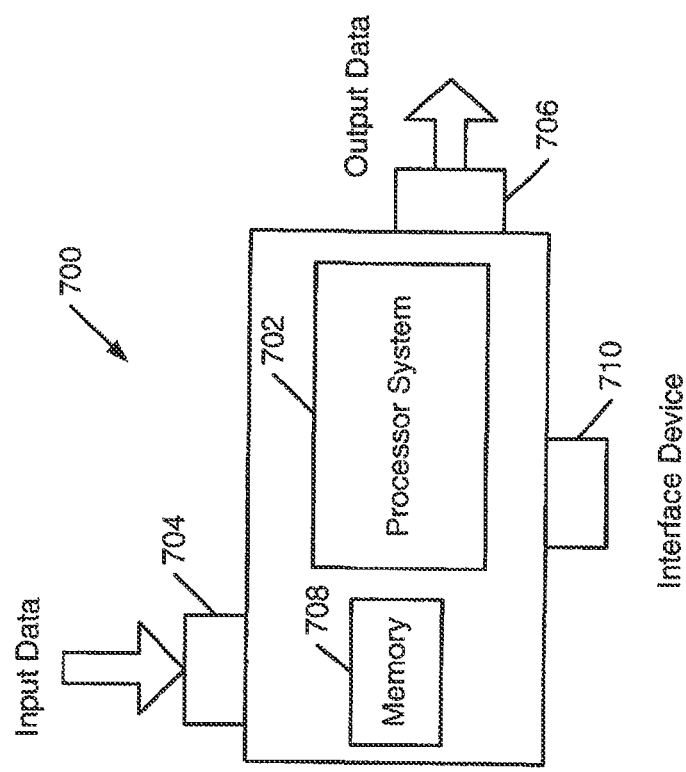
FIG. 7 illustrates a schematic diagram of a computer system that may be used in analyzing and processing athletic performance data in systems and methods according to examples of this invention.

In FIG. 7, the computer system 700 has a programmable processor system 702, such as one or more microprocessors implemented on an integrated circuit. The computer system 700 also may have a plurality of input devices 704 and/or output devices 706, as well as a memory 708. The input devices 704 and output devices 706 may include any devices for receiving input data and providing output data, respectively, including conventional devices known in the art. As some more specific examples, the input devices 704 may include, for example, keyboards, microphones, scanners, network connections, disk drives, and/or pointing devices for receiving input from a user or another source. Examples of suitable output devices 706 may include, for example, display monitors, speakers, printers, tactile feedback devices, network connections, and disk drives. These devices and systems, and their connections, are well known in the art, and thus will not be discussed at length here.

The memory 708 may be implemented using any combination of computer-readable media that can be accessed, either directly or indirectly, by the processor system 702. The computer-readable media may include, for example, microcircuit memory devices, such as read-write memory (RAM), read-only memory (ROM), electronically erasable and programmable read-only memory (EEPROM) or flash memory microcircuit devices, CD-ROM disks, digital video disks (DVD) or other optical storage devices. The computer-readable media also may include magnetic cassettes, magnetic tapes, magnetic disks or other magnetic storage devices, punched media, holographic storage devices, or any other medium that can be used to store desired information.

In at least some examples of the invention, the computer system 700 also may include one or more interface devices 710 for exchanging data with other computers. The interface device(s) 710 may include, for example, modems, wired network cards, wireless network cards, and/or any other suitable device(s) for communicating with one or more remote computers. Each of the processor system 702, the input devices 704, the output devices 706, the memory 708, and the user interface device 710 may be interconnected using a data bus, as is conventional and known in the art. As will be appreciated by those skilled in the art, the data bus may by implemented using any type of suitable bus structure, including through conventional structures known in the art.

D. Conclusion

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

The invention claimed is:

1. A computer-implemented method, comprising:
  receiving, from at least an integrated location determining sensor and a heart rate sensor, athletic performance data of an athlete moving along a route, the data relating to at least one physical characteristic and at least one physiological characteristic measured during the athletic performance along the route;

outputting for display, information relating to the athletic performance configured to be displayed after the athletic performance has been completed; and determining difficulty rankings of the route, based on the at least one physical characteristic, the at least one physiological characteristic, and prevailing weather information, wherein the information correlates at least one physical characteristic and at least one physiological characteristic of the athletic performance along the route to time, distance, or location along the route, wherein the outputting for display is configured to simultaneously display at least some of the athletic performance data relating to the physical characteristic and the physiological characteristic correlated to time, distance, or location along the route on a mapped representation of the route, and wherein an appearance of the mapped representation of the route is based on the determined difficulty rankings.

2. The computer-implemented method of claim 1, wherein the information outputted for display is displayed on a user interface configured to display at least a portion of the route and the user interface comprises:

a route marker designating movement of the athlete between a first location and a second location along the route, wherein a visual appearance of the route marker is based on at least a portion of the athletic performance data correlated to time, distance, or location along the route.

3. The computer-implemented method of claim 1, wherein the information outputted for display is displayed on a user interface configured to display at least a portion of the route and the user interface comprises:

a route marker designating movement of the athlete between a first location and a second location along the route, wherein a visual appearance of the route marker correlates route data from the athletic performance against data associated with one or more previous athletic performances.

4. The computer-implemented of claim 2, wherein the visual appearance of the route marker is based, at least in part, on at least one criterion selected from the group consisting of: elevation changes over the route, altitude of the route, temperature during the athletic performance, humidity during the athletic performance, wind speed during the athletic performance, and wind direction during the athletic performance, and a combination thereof.

5. The computer-implemented method of claim 1, wherein the information outputted for display is displayed on a user interface configured to display at least a portion of the route and the user interface comprises:

a route marker designating movement of the athlete between a first location and a second location along the route, wherein a visual appearance of the route marker is based on a pace of the athlete along a respective point between the first location and the second location represented by the marker.

6. The computer-implemented of claim 1, wherein the information outputted for display is displayed on a user interface configured to display at least a portion of the route and the user interface comprises:

wherein a visual appearance of a route marker is based, at least in part, on at least one criterion selected from the group consisting of: elevation changes over the route, altitude of the route, temperature during the athletic performance, humidity during the athletic performance, wind speed during the athletic performance, and wind direction during the athletic performance, and a combination thereof.

7. A computer-implemented method according to claim 1, further comprising: receiving a user input from a user input system configured to allow a user to select a first location along of the mapped representation of the route.

8. A computer-implemented method according to claim 7, wherein the outputting for display is configured to display data relating to at least one physical characteristic and data relating to at least one physiological characteristic corresponding to the first location is displayed in response to a user selection of the first location.

9. A computer-implemented method according to claim 7, wherein the user input system allows the user to position a cursor at a second location on the mapped representation of the route displayed without selecting the second location, wherein the second location is different from the first location.

10. A computer-implemented method according to claim 9, further comprising:

temporarily displays data relating to at least one physical characteristic and data relating to at least one physiological characteristic corresponding to the second location in response to the user positioning of the cursor at the second location.

11. A computer-implemented method according to claim 1, wherein information outputted for display is configured to display an icon that is automatically movable along the mapped representation of the route.

12. A computer-implemented method according to claim 11, wherein the automatic movement of the icon is based upon a pace of the athlete during the route.

13. A computer-implemented method according to claim 11, wherein the automatic movement of the icon is based upon at least one physical characteristic or one physiological characteristic.

14. A computer-implemented method according to claim 11, wherein the movement of the icon is configured to correspond at least a portion of the displayed data to a position of the icon along the route.

15. An athletic monitoring device, comprising:

a location determining sensor configured to obtain data relating to a series of time-stamped athletic data points of the athlete during an athletic performance, wherein the athletic performance includes movement of the athlete along a route;

a non-transitory computer-readable medium that comprises computer-executable instructions, that when executed by a processor, performs at least:

calculating with the processor, data relating to at least one of a speed or a distance moved by the athlete along the route during the athletic performance;

determining difficulty rankings of the route, based on the at least one of a speed or a distance moved by the athlete, and prevailing weather along the route during the athletic performance determining whether the route corresponds to a route used during a previous athletic performance;

comparing the data relating to at least one of the speed or the distance moved by the athlete during the athletic performance with data relating to the speed or the distance moved during the previous athletic performance when the route used during the athletic performance is determined to have corresponded to the route used during the previous athletic performance; and outputting for display, information relating to at least one of the speed or the distance moved by the athlete during the athletic performance and information relating to at least one of the speed or the distance moved during the previous athletic performance along with a representation of the route on a map, wherein the representation of the route is based on the determined difficulty rankings.

16. The device of claim 15, wherein the location determining sensor is configured to obtain data relating to the series of time-stamped athletic data points by the athlete during the athletic performance; and the calculating data relating to at least one of a speed or a distance moved by the athlete along the route during the athletic performance is based, at least in part, on the data from the location determination sensor.

17. The device of claim 16, wherein the information outputted for display is displayed on a user interface configured to display at least a portion of the route and the user interface comprises:

a route marker designating movement of the athlete between a first location and a second location along the route, wherein a visual appearance of the route marker is based on a pace of the athlete along a respective point between the first location and the second location represented by the marker.

18. The device of claim 15, wherein the information outputted for display is configured to display an icon that is automatically movable along the mapped representation of the route.

19. The device of claim 18, wherein the automatic movement of the icon is based upon at least one physical characteristic or one physiological characteristic of the athlete along a respective location of the route.

20. The device of claim according to claim 18, wherein the movement of the icon is configured to correspond at least a portion of the displayed data to a position of the icon along the route.

* * * * *